United States Patent
Xiong

(10) Patent No.: US 12,477,486 B2
(45) Date of Patent: Nov. 18, 2025

(54) METHOD FOR IMPLEMENTING TIME SYNCHRONIZATION AND RELATED DEVICE

(71) Applicant: Tencent Technology (Shenzhen) Company Limited, Shenzhen (CN)

(72) Inventor: Chunshan Xiong, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 946 days.

(21) Appl. No.: 17/675,598

(22) Filed: Feb. 18, 2022

(65) Prior Publication Data

US 2022/0174625 A1    Jun. 2, 2022

Related U.S. Application Data

(63) Continuation of application No. PCT/CN2021/076206, filed on Feb. 9, 2021.

(30) Foreign Application Priority Data

Mar. 23, 2020 (CN) .......................... 202010207526.2

(51) Int. Cl.
    *H04J 1/00*      (2006.01)
    *H04J 3/06*      (2006.01)
    (Continued)

(52) U.S. Cl.
    CPC ......... *H04W 56/001* (2013.01); *H04J 3/0644* (2013.01); *H04J 3/0667* (2013.01); *H04W 48/18* (2013.01)

(58) Field of Classification Search
None
See application file for complete search history.

(56) References Cited

U.S. PATENT DOCUMENTS

2022/0393784 A1 * 12/2022 Li ..................... H04W 56/001

FOREIGN PATENT DOCUMENTS

| CN | 109639493 A | 4/2019 |
| CN | 110267312 A | 9/2019 |

(Continued)

OTHER PUBLICATIONS

International Search Report and Written Opinion received for Application No. PCT/CN2021/076206 mailed Apr. 27, 2021 (English and Chinese languages) (11 pages).

(Continued)

*Primary Examiner* — Willie J Daniel, Jr.
(74) *Attorney, Agent, or Firm* — Crowell & Moring LLP

(57) ABSTRACT

Time synchronization between communication devices may be necessary for proper communications. The time synchronization may include determining a first target Session Management Function of a first terminal based on first target Single Network Slice Selection Assistance Information, a first target Data Network Name, first identity information, and first type indication information of a first time-sensitive network grandmaster clock by using a Network Repository Function. A first target label information may be obtained from a Unified Data Manager based on the first target Single Network Slice Selection Assistance Information, the first target Data Network Name, the first identity information, and the first type indication information of the first time-sensitive network grandmaster clock.

20 Claims, 14 Drawing Sheets

(51) Int. Cl.
*H04W 48/18* (2009.01)
*H04W 56/00* (2009.01)

(56) References Cited

FOREIGN PATENT DOCUMENTS

| | | |
|---|---|---|
| CN | 110392422 A | 10/2019 |
| CN | 110535552 A | 12/2019 |
| CN | 110611924 A | 12/2019 |
| CN | 110636547 A | 12/2019 |
| CN | 110832951 A | 2/2020 |
| CN | 111490841 A | 8/2020 |
| WO | WO 2018/166576 A1 | 9/2018 |

OTHER PUBLICATIONS

Extended European Search Report, dated Dec. 15, 2022, pp. 1-10, issued in European Patent Application No. 21776752.4, European Patent Office, The Hague, The Netherlands.

"3rd Generation Partnership Project; Technical Specification Group Services and System Aspects; Study on enhanced support of Industrial Internet of Things (IIoT) in 5G System (Release 17)," dated Jan. 28, 2020, pp. 1-33, 3GPP Standard; Technical Report; 3GPP TR 23.700-20, 3rd Generation Partnership Project (3GPP), V0.3.0, Mobile Competence Centre; 650, Route Des Lucioles; F-06921 Sophia-Antipolis Cedex; France.

"3rd Generation Partnership Project; Technical Specification Group Services and System Aspects; Procedures for the 5G System (5GS); Stage 2 (Release 15)," dated Dec. 22, 2019, pp. 1-360, 3GPP Standard; Technical Specification; 3GPP TS 23.502, 3rd Generation Partnership Project (3GPP), vol. SA WG2, No. V15.8.0 Mobile Competence Centre; 650, Route Des Lucioles; F-06921 Sophia-Antipolis Cedex; France.

Mediatek Inc et al: "Solution for key issue#1: Uplink Time Synchronization," dated Nov. 22, 2019, pp. 1-5, 3GPP Draft; S2-1912398, 3rd Generation Partnership Project (3GPP), vol. SA WG2, No. Reno, USA, Mobile Competence Centre; 650, Route Des Lucioles; F-06921 Sophia-Antipolis Cedex; France.

* cited by examiner

US 12,477,486 B2

METHOD FOR IMPLEMENTING TIME SYNCHRONIZATION AND RELATED DEVICE

RELATED APPLICATION

This application claims priority to PCT Application No. PCT/CN2021/076206, filed Feb. 9, 2021, published as WO2021190192A1, entitled "METHOD FOR IMPLEMENTING TIME SYNCHRONIZATION AND RELATED DEVICE", which claims priority to Chinese Patent Application No. 202010207526.2, filed with the China National Intellectual Property Administration on Mar. 23, 2020, and entitled "METHOD FOR IMPLEMENTING TIME SYNCHRONIZATION AND RELATED DEVICE", each of which are incorporated herein by reference in their entirety.

FIELD OF THE TECHNOLOGY

The present disclosure discloses the field of communication technologies, and specifically, to a method and an apparatus for implementing time synchronization, an electronic device, and a computer-readable storage medium.

BACKGROUND OF THE DISCLOSURE

Time sensitive communication (TSC) is introduced into the R16 standard for $5^{th}$ generation (5G) mobile network systems to allow the 5G systems (5GSs) to support industrial automation manufacturing applications with precise time control. According to the guidelines of the R16 standard for 5GSs, a 5GS may be integrated into a TSN as an Ethernet bridge of the TSN, and the integrated system may be referred to as a TSN communication system.

However, the 5G R17 standard raises new time synchronization requirements. Therefore, there is a need for a novel method and apparatus for implementing time synchronization, electronic device, and computer-readable storage medium.

The information disclosed in the foregoing related art is only used for enhancing the understanding of the background of the present disclosure.

SUMMARY

Embodiments of the present disclosure provide a method and an apparatus for implementing time synchronization, an electronic device, and a computer-readable storage medium, which can assist in implementing new time synchronization requirements raised in 5G.

Other characteristics and advantages of the present disclosure become apparent from the following detailed description, or may be learned in part through the practice of the present disclosure.

Embodiments of the present disclosure provide a method for implementing time synchronization, performed by an electronic device, the method including: receiving a first request transmitted by a first terminal, the first terminal being connected to a first time-sensitive network grandmaster clock in a first time-sensitive network time domain, the first request comprising target Single Network Slice Selection Assistance Information, a target Data Network Name, first identity information of the first time-sensitive network time domain, first type indication information of the first time-sensitive network grandmaster clock, a first Protocol Data Unit session identity, and a first Protocol Data Unit session request information element; determining a first target Session Management Function of the first terminal according to the target Single Network Slice Selection Assistance Information, the target Data Network Name, the first identity information, the first type indication information of the first time-sensitive network grandmaster clock in the first request by using a Network Repository Function; transmitting the target Single Network Slice Selection Assistance Information, the target Data Network Name, the first identity information, the first type indication information of the first time-sensitive network grandmaster clock and the first Protocol Data Unit session request information element to the first target Session Management Function, wherein the first target Session Management Function stores first target label information of the first target Session Management Function, the target Single Network Slice Selection Assistance Information, the target Data Network Name, the first identity information, and the first type indication information of the first time-sensitive network grandmaster clock for the first terminal in a Unified Data Manager; receiving a second request transmitted by a second terminal, the second terminal being connected to a first time-sensitive network end station in the first time-sensitive network time domain, the second request comprising the target Single Network Slice Selection Assistance Information, the target Data Network Name, the first identity information, second type indication information of the first time-sensitive network end station, a second Protocol Data Unit session identity, and a second Protocol Data Unit session request information element; and obtaining the first target label information from the Unified Data Manager according to the target Single Network Slice Selection Assistance Information, the target Data Network Name, the first identity information, and the first type indication information of the first time-sensitive network grandmaster clock in the second request.

The embodiments of the present disclosure provide an apparatus for implementing time synchronization, the apparatus including: a first request receiving unit, configured to receive a first request transmitted by a first terminal, the first terminal being connected to a first time-sensitive network grandmaster clock in a first time-sensitive network time domain, the first request comprising target Single Network Slice Selection Assistance Information, a target Data Network Name, first identity information of the first time-sensitive network time domain, first type indication information of the first time-sensitive network grandmaster clock, a first Protocol Data Unit session identity, and a first Protocol Data Unit session request information element; a first Session Management Function determining unit, configured to determine a first target Session Management Function of the first terminal according to the target Single Network Slice Selection Assistance Information, the target Data Network Name, the first identity information, the first type indication information of the first time-sensitive network grandmaster clock in the first request by using a Network Repository Function; a first data storage unit, configured to transmit the target Single Network Slice Selection Assistance Information, the target Data Network Name, the first identity information, the first type indication information of the first time-sensitive network grandmaster clock and the first Protocol Data Unit session request information element to the first target Session Management Function, wherein the first target Session Management Function stores first target label information of the first target Session Management Function, the target Single Network Slice Selection Assistance Information, the target Data Network Name, the first identity information, and the first type indication information of the first time-sensitive network grandmaster clock for the first terminal in a Unified Data Manager; a second request receiving unit, configured to receive a second request transmitted by a second terminal, the second terminal being connected to a first time-sensitive network end station in the first time-sensitive network time domain, the second request comprising the target Single Network Slice Selection Assistance Information, the target Data Network Name, the first identity information, second type indication information of the first time-sensitive network end station, a second Protocol Data Unit session identity, and a second Protocol Data Unit session request information element; and a first target label information obtaining unit, configured to obtain the first target label information from the Unified Data Manager according to the target Single Network Slice Selection Assistance Information, the target Data Network Name, the first identity information, and the first type indication information of the first time-sensitive network grandmaster clock in the second request.

The embodiments of the present disclosure provide a terminal, the terminal being connected to a first time-sensitive network grandmaster clock in a first time-sensitive network time domain, the terminal including: one or more processors; and a storage apparatus, configured to store one or more programs, the one or more programs, when executed by the one or more processors, causing the one or more processors to perform the following operation: transmitting a first request to an Access and Mobility Management Function or a Service Communication Proxy, the first request comprising target Single Network Slice Selection Assistance Information, a target Data Network Name, first identity information of the first time-sensitive network time domain, first type indication information of the first time-sensitive network grandmaster clock, a first Protocol Data Unit session identity, and a first Protocol Data Unit session request information element.

The embodiments of the present disclosure provide a terminal, the terminal being connected to a first time-sensitive network end station in a first time-sensitive network time domain, the terminal including: one or more processors; and a storage apparatus, configured to store one or more programs, the one or more programs, when executed by the one or more processors, causing the one or more processors to perform the following operation: transmitting a second request to an Access and Mobility Management Function or a Service Communication Proxy, the second request comprising target Single Network Slice Selection Assistance Information, a target Data Network Name, first identity information of the first time-sensitive network time domain, second type indication information of the first time-sensitive network end station, a second Protocol Data Unit session identity, and a second Protocol Data Unit session request information element.

The embodiments of the present disclosure provide a terminal, the terminal being separately connected to a first time-sensitive network end station in a first time-sensitive network time domain, a second time-sensitive network end station in a second time-sensitive network time domain, and a third time-sensitive network end station in a third time-sensitive network time domain, the terminal including: one or more processors; and a storage apparatus, configured to store one or more programs, the one or more programs, when executed by the one or more processors, causing the one or more processors to perform the following operations: transmitting a fourth request to an Access and Mobility Management Function or a Service Communication Proxy, the fourth request comprising target Single Network Slice Selection Assistance Information, a target Data Network Name, first identity information of the first time-sensitive network time domain, second type indication information of the first time-sensitive network end station, second identity information of the second time-sensitive network time domain, second type indication information of the second time-sensitive network end station, third identity information of the third time-sensitive network time domain second type indication information of the third time-sensitive network end station, a fourth Protocol Data Unit session identity, and a fourth Protocol Data Unit session request information element; and receiving a target label information failure indication or a fourth Protocol Data Unit session setup failure message returned in response to the fourth request.

The embodiments of the present disclosure provide a computer-readable storage medium, storing a computer program, the computer program being executed by a processor to implement the method for implementing time synchronization in the foregoing embodiments.

The embodiments of the present disclosure provide an electronic device, including: one or more processors; and a storage apparatus, configured to store one or more programs, the one or more programs, when executed by the one or more processors, causing the one or more processors to implement the method for implementing time synchronization in the foregoing embodiments.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings herein are incorporated in and constitute a part of the specification, illustrate embodiments of the present disclosure, and are used to explain the principle of the present disclosure together with the specification. Apparently, the accompanying drawings in the following description show merely some embodiments of the present disclosure, and a person of ordinary skill in the art may still derive other drawings from these accompanying drawings without creative efforts. In the accompanying drawings.

DESCRIPTION OF EMBODIMENTS

Figure 1:
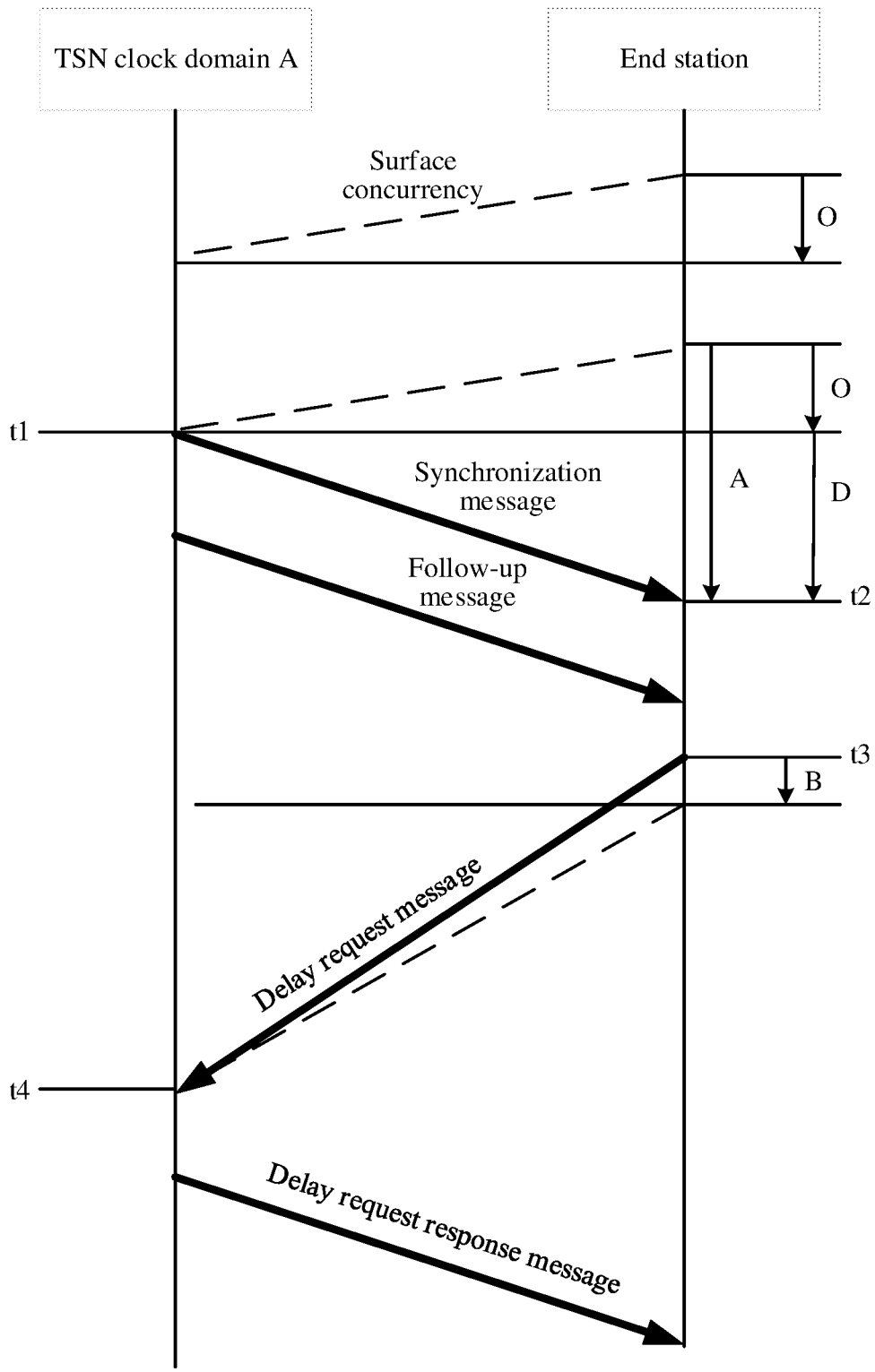
FIG. 1 is a schematic diagram of a time synchronization method in the related art.

Example implementations will now be described more thoroughly with reference to the accompanying drawings. However, the example implementations can be implemented in various forms and is not to be construed as being limited to the examples set forth herein. Rather, the implementations are provided wherein the present disclosure can be more comprehensive and complete, and the concepts of the example implementations are fully conveyed to a person skilled in the art.

In addition, the described features, structures or characteristics may be combined in one or more embodiments in any appropriate manner. In the following descriptions, many specific details are provided to obtain a thorough understanding of the embodiments of the present disclosure. However, a person skilled in the art is to be aware that, the technical solutions of the present disclosure may be implemented without one or more specific details, or another method, component, apparatus, step, and the like may be used. In other cases, well-known methods, apparatuses, implementations, or operations are not shown or described in detail, in order not to obscure the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses. The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The flowcharts shown in the accompanying drawings are merely example descriptions, do not need to include all content and operations/steps, and do not need to be performed in the described orders either. For example, some operations/steps may be further divided, while some operations/steps may be combined or partially combined. Therefore, an actual execution order may change according to an actual case.

Particularly, according to an embodiment of the present disclosure, the processes described below by referring to the flowcharts may be implemented as computer software programs. For example, the embodiments of this application include a computer program product, including a computer program carried on a computer-readable storage medium. The computer program includes program code for performing the method shown in the flowchart.

The computer-readable medium shown in the present disclosure may be a computer-readable signal medium, a computer-readable storage medium, or any combination thereof. The computer-readable storage medium may be, for example, but is not limited to, an electric, magnetic, optical, electromagnetic, infrared, or semi-conductive system, apparatus, or component, or any combination of the above. More specific examples of the computer-readable storage medium may include, but are not limited to, an electrical connection having one or more wires, a portable computer magnetic disk, a hard disk, a random access memory (RAM), a (ROM), an erasable programmable read-only memory (EPROM) (or flash memory), an optical fiber, a compact disc read-only memory (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal included in a baseband or propagated as a part of a carrier, the data signal carrying or comprising computer-readable program code. A data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The program code contained in the computer-readable storage medium may be transmitted by using any appropriate medium, including but not limited to: a wireless medium, a wire, an optical cable, a radio frequency (RF) medium, or any appropriate combination thereof.

The flowcharts and block diagrams in the accompanying drawings show architectures, functions, and operations that may be implemented by using the method, the apparatus, and the computer program product according to the embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The involved units described in the embodiments of the present disclosure may be implemented in a software manner, or may be implemented in a hardware manner, and the described units may also be disposed in a processor. Names of the units do not constitute a limitation on the units in a specific case.

In another embodiment, the present disclosure further provides a computer-readable storage medium. The computer-readable storage medium may be included in the electronic device described in the foregoing embodiments, or may exist alone and is not disposed in the electronic device. The computer-readable storage medium carries one or more programs, the one or more programs, when executed by the electronic device, causing the electronic device to implement the method described in the following embodiments. For example, the electronic device may be an Access and Mobility Management Function (AMF) or a Service Communication Proxy (SCP) and may implement steps shown in FIG. 5, FIG. 10, or FIG. 13.

FIG. 1 is a schematic diagram of a time synchronization method in the related art.

In the related art, clock offset measurement may be implemented by using Precision Time Protocol (PTP, defined by the Institute of Electrical and Electronics Engineers (IEEE) 1588 protocol)/generalized Precision Time Protocol (gPTP, defined by the IEEE 802.1AS protocol) messages and algorithms.

As shown in FIG. 1, a time data receiver (assumed as an end station (ES, which is a device connected to a metropolitan area network or a local area network and is used as an origin and/or a destination for carrying traffic in the metropolitan area network or local area network) herein) uses a method defined by the IEEE 1588v2 protocol to measure a clock offset (0) and a delay (D) from a TSN clock domain A through a received data packet.

The clock offset and the delay are implemented through some procedures and algorithms, using the following formulas:

$O = \text{Offset} = (t2+t3-t1-t4)/2$, $t2 = t1+D+O$, $A = t2-t1 = D+O$, $B = t4-t3 = D-O$, Delay $D = (A+B)/2$, Offset $O = (A-B)/2$, and $t4 = t3-O+D$.

In the foregoing formulas, A and B are intermediate variables; t1 is a time value of the TSN clock domain A carried in a synchronization (Sync) message or a Follow_up message; t2 and t3 are time values of a local clock of the ES, t2 represents a corresponding time value of the local clock when the ES receives the Sync message, and t3 represents a corresponding time value of the local clock when the ES transmits a delay request (Delay_Req) message; D represents a transmission delay value of transmitting the Sync message from the TSN clock domain A to the ES; and t4 is a corresponding time value of the TSN clock domain A when the TSN clock domain A receives the Delay_Req message.

After measuring either the clock offset between the local clock of the ES and the TSN clock domain A or the delay, the ES may use the measured parameter to set a time of the local clock of the ES or the TSN clock domain A, so that time synchronization between local time of the ES and a grandmaster clock of the TSN clock domain A can be implemented. This is an algorithm for performing time synchronization between the ES in the TSN clock domain A and the grandmaster clock of the TSN clock domain A.

In an actual application, after a period of time, a difference between the time of the ES and the time of the grandmaster clock of the clock domain A keeps increasing. To ensure the time accuracy and stability of the ES, the foregoing measurement process is repeated periodically to ensure that the difference between the time of the ES and the time of the grandmaster clock of the clock domain A is within a particular range. Because there are a large number of ESs in one clock domain, if such bidirectional signaling interaction is performed between every ES and the grandmaster clock, the implementation cost of the grandmaster clock is greatly increased, and the clock stability and accuracy of the clock domain are affected. To simplify this measurement process, instead of bidirectional signaling interaction with every ES, the grandmaster clock periodically transmits a Sync message (and may also transmit a Follow_up message) with a destination address being a multicast address. A network transmitting these messages accurately calculates a transmission delay of the Sync message (also the Follow_up message in some embodiments) from the grandmaster clock to the ES. In this way, the ES may implement time synchronization with the grandmaster clock according to the delay provided by the network and a time value of the grandmaster clock in the Sync message (also the Follow_up message in some embodiments). For an example implementation, reference may be made to the IEEE 802.1AS protocol.

Figure 2:
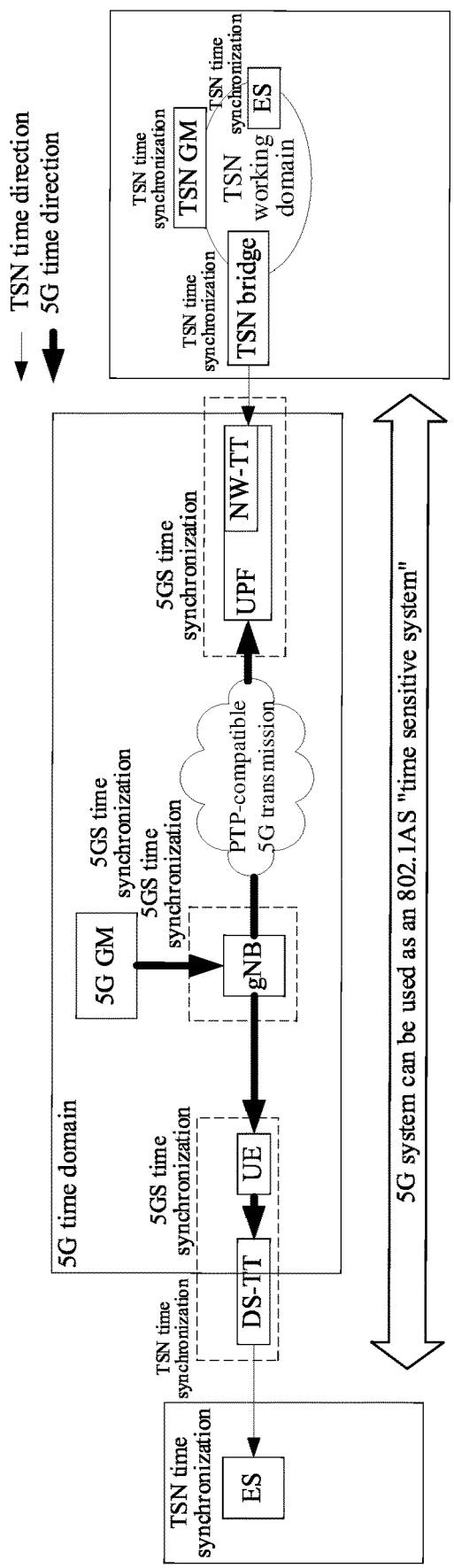
FIG. 2 is a schematic architectural diagram of 5G supporting time synchronization in an external time domain in the related art.

FIG. 2 is a schematic architectural diagram of 5G supporting time synchronization in an external time domain in the related art.

As shown in FIG. 2, a 5GS is integrated as a TSN bridge in a TSN system. The "logical" TSN bridge includes a TSN translator for user plane interaction between the TSN system and a 5GS. 5GS TSN translator functionality includes a Device Side TSN Translator (DS-TT) and a NetWork TSN Translator (NW-TT). UE in the 5GS is connected to one or more ESs in a TSN Data Network (DN) outside the 5GS by the DS-TT. A User Plane Function (UPF) is connected to one or more ESs in the TSN DN by the NW-TT.

To implement a TSN synchronization mechanism, the entire end-to-end 5GS may be considered as an IEEE 802.1AS time aware system. As shown in FIG. 2, there are two time synchronization domains, namely, a 5G time domain and a TSN time domain. The 5GS has its own time (for example, Global Positioning System (GPS) time) system. A 5G grandmaster (GM) clock in FIG. 2 is used to represent a clock domain (that is, the 5G time domain) of the 5GS.

A gNB in FIG. 2 represents a 5G base station. Devices in the 5GS include a UPF, a Session Management Function (SMF), an NG Radio Access Network (RAN, a 5G RAN function device, in which an NG interface is an interface between the RAN and a 5G core network), User Equipment (UE, or referred to as a terminal hereinafter), a DS-TT, an NW-TT, and the like. These devices are all synchronized into the clock domain of the 5GS (that is, the 5G time domain).

As shown in FIG. 2, a clock source of an external TSN time domain is located outside the UPF. A device ES on a side of UE of a TSN is connected to the UE by the DS-TT to access a 5G network, and then accesses an external TSN network through the UPF and the NW-TT on the UPF to perform time synchronization with a clock source of the TSN.

In FIG. 2, a time synchronization message is transmitted by a TSN GM through downlink (DL) data, that is, transmitted through a user plane of the UE. The DL data including the time synchronization message of the TSN GM first reaches the NW-TT/UPF, enters the 5GS, then reaches the UE and the DS-TT of the UE, and finally reaches the ES on the side of the UE.

The TSN GM identifies a current time in the originTimestamp field of the time synchronization message transmitted by the TSN GM. While the user plane of the UE transfers the time synchronization message, the NW-TT adds a receiving time at which the NW-TT receives the DL data to the time synchronization message, and updates the value of the CorrectionField of the time synchronization message in the DL data to a sum of the original value of the CorrectionField and a transmission delay value between the NW-TT and an Ethernet Bridge Port that transmits the message to the NW-TT. The transmission delay between the NW-TT and the Port may be obtained by using the method shown in FIG. 1 or in another manner. Before the DS-TT forwards the DL data to the ES, the receiving time added by the NW-TT to the DL data is subtracted from the current time of the DL data to obtain a transmission delay value of the time synchronization message in the entire 5GS. The delay value and a previous transmission time (in the CorrectionField of the received time synchronization message) from the TSN GM to the NW-TT are added to obtain an updated transmission delay value. The updated transmission delay value is added to the CorrectionField (that is, a total transmission delay of the message) of the time synchronization message, and at the same time the receiving time previously added by the NW-TT is deleted. Then the modified time synchronization message is transmitted to the ES.

The ES directly adds the delay value in the time synchronization message to the transmission delay between the DS-TT and the ES (the transmission delay between the ES and the DS-TT may be obtained by using the method shown in FIG. 1 or in another manner) according to the delay value (that is, the value of the CorrectionField in the time synchronization message) that is added to the time synchronization message by the DS-TT. A total transmission delay of transmitting the time synchronization message from the TSN GM to the ES may be obtained. A calculated time value may be obtained by adding the total transmission delay to the value of the originTimestamp field in the time synchronization message, and then the clock of the ES is set to the calculated time value, thereby implementing time synchronization between the ES on the side of the UE and the TSN GM.

Figure 3:
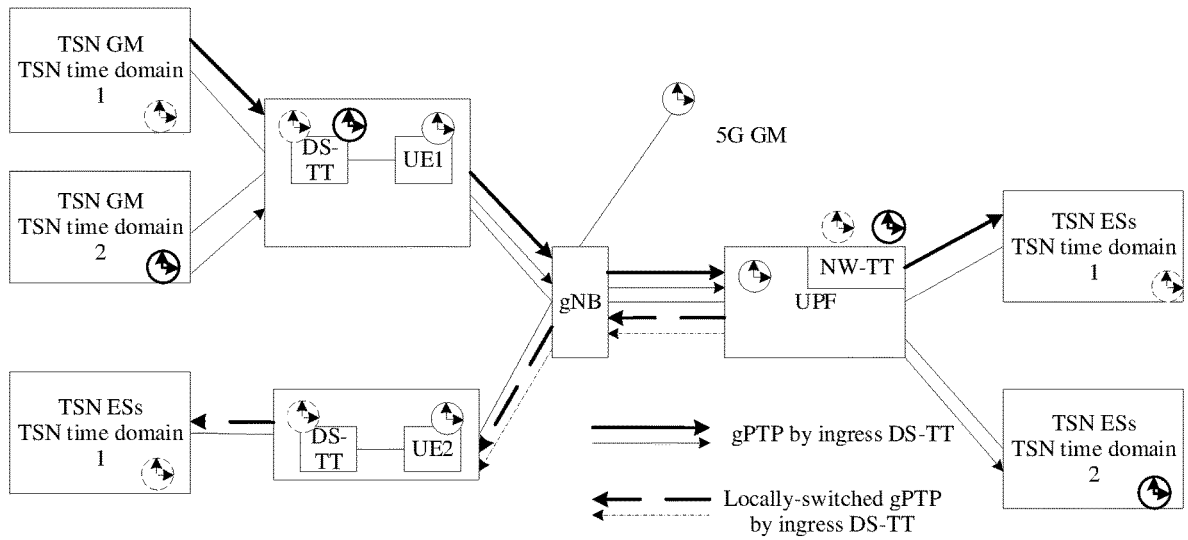
FIG. 3 is a schematic architectural diagram of a new time synchronization requirement proposed in the 5G R17 standard.

FIG. 3 is a schematic architectural diagram of a new time synchronization requirement proposed in the 5G R17 standard.

In FIG. 2, the ES on the side of the UE needs to synchronize time to a TSN GM on a side of the UPF/NW-TT. However, in a new 5G standard to be formulated, as shown in FIG. 3, a TSN GM is on a side of UE1. In this case, an ES on a UPF/NW-TT side and an ES on another UE (for example, UE2 in FIG. 3) need to be synchronized in time with the TSN GM on the side of UE1. That is, the TSN GM transmits a time synchronization message through a user plane of UE1 by using an uplink method, and then the time synchronization message reaches the UPF.

For a TSN ES outside the UPF, the time synchronization message is transmitted through the NW-TT. For an ES on UE2 at a lower left corner in FIG. 3, the UPF transmits a time synchronization message to UE2 through DL data transmitted to UE2, and then is transmitted to a TSN ES through a DS-TT (also referred to as a UE2 DS-TT hereinafter) of UE2.

In FIG. 3, a DS-TT (also referred to as a UE1 DS-TT hereinafter) of UE1 records a receiving time at which UE1 receives an uplink (UL) data packet that is transmitted by the TSN GM and includes the time synchronization message, and adds the receiving time to the UL data packet. In addition, the value of the CorrectionField of the time synchronization message in the UL data packet is updated to a sum of the original value of the CorrectionField and a transmission delay value between a DS-TT and the TSN GM. A transmission delay between the DS-TT and the TSN GM may be obtained by using the method shown in FIG. 1 or in another manner. The NW-TT subtracts a receiving time added by the UE1 DS-TT to the UL data packet from the time at which the NW-TT receives the UL data packet, to obtain a transmission delay value of the UL data packet in the entire 5GS. The delay value and a previous transmission time (in the CorrectionField of the received time synchronization message) from the TSN GM to the UE1 DS-TT are added to obtain an updated transmission delay value. The updated transmission delay value is added to the CorrectionField of the time synchronization message in the UL data packet. In addition, the receiving time added by the UE1 DS-TT is deleted. The UL data packet is then transmitted to a TSN ES (including TSN ESs in the TSN time domain 1 and the TSN time domain 2) connected to the NW-TT on the right side. According to the method described in FIG. 2, the TSN ES connected to the NW-TT on the right side directly adds the delay value in the time synchronization message to the transmission delay between the NW-TT and the TSN ES according to the delay value (that is, the value of the CorrectionField in the time synchronization message) that is added to the time synchronization message by the NW-TT. A total transmission delay of the time synchronization message from the TSN GM to the TSN ES connected to the NW-TT may be obtained. A calculated time value may be obtained by adding the total transmission delay to the value of the originTimestamp field in the time synchronization message, and then the clock of the ES is set to the calculated time value, thereby implementing time synchronization between the TSN ES on the side of the NW-TT and the TSN GM on the side of UE1.

If a time synchronization message is to be sent to the TSN ES of UE2, the UPF at the same time transmits the time synchronization message to the UE2 through the user plane of UE2, and then the time synchronization message reaches the UE2 DS-TT. Similarly, the UE2 DS-TT subtracts a receiving time added by the UE1 DS-TT to a DL data packet including the time synchronization message from the time at which the UE2 DS-TT receives the DL data packet, to obtain a transmission delay value of the DL data packet including the time synchronization message in the entire 5GS. The transmission delay value and a previous transmission time (in the CorrectionField of the received time synchronization message) from the TSN GM to the UE1 DS-TT are added to obtain an updated transmission delay value. The updated transmission delay value is added to the CorrectionField of the time synchronization message in the DL data packet. In addition, the receiving time added by the UE1 DS-TT is deleted. Then the DL data packet is transmitted to the TSN ES on the UE2 DS-TT. Similarly, according to the method described above, the TSN ES on the UE2 DS-TT may implement time synchronization with the TSN GM on the side of the UE1.

In FIG. 3, a solid arrow represents a gPTP by ingress DS-TT; and a dashed arrow represents a Locally-switched gPTP by ingress DS-TT.

Figure 4:
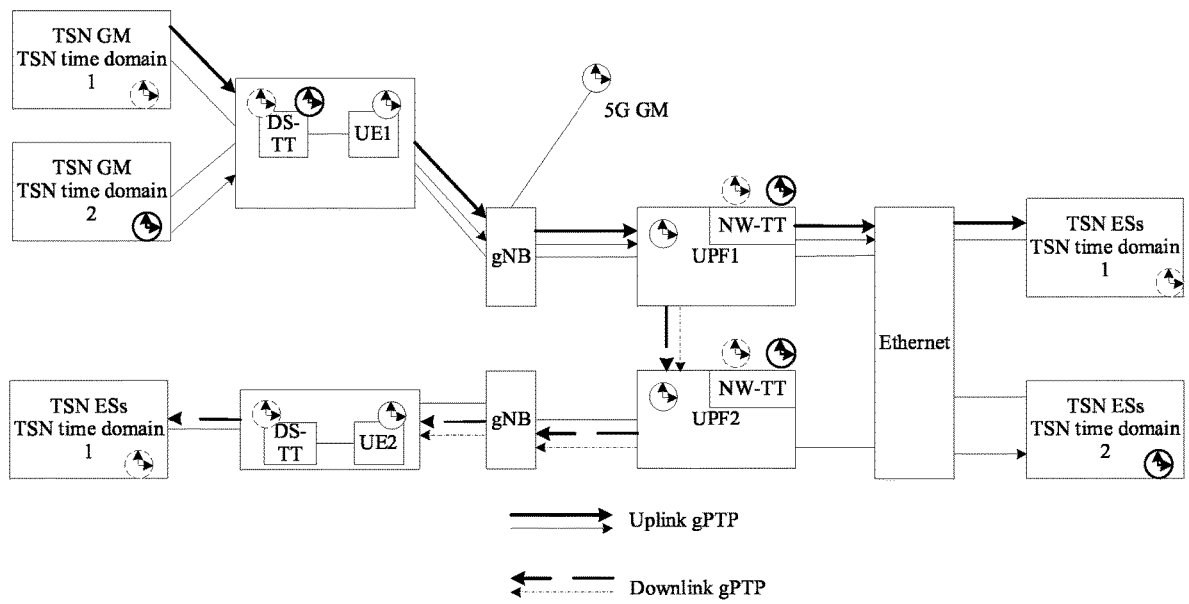
FIG. 4 is a schematic architectural diagram of another new time synchronization requirement proposed in the 5G R17 standard.

FIG. 4 is a schematic architectural diagram of another new time synchronization requirement proposed in the 5G R17 standard.

As shown in FIG. 4, UE1 and UE2 are respectively connected to UPF1 and UPF2. Similarly, according to the method described above, the TSN ES on the UE2 DS-TT may implement time synchronization with the TSN GM on the side of the UE1.

Due to the diversity of deployment, in FIG. 3 and FIG. 4 above, the UE1 DS-TT is connected to the TSN GM of the TSN Time Domain 1, and the UE2 DS-TT is connected to one or more ESs of the TSN Time Domain 1. For the same TSN Time Domain 1, different UEs/DS-TTs and ESs connected to the UEs/DS-TTs participate in communication. To instruct the UPF to forward a UL time synchronization message transmitted by UE1 to UE2, UE3, and . . . that are to receive the message, it is required that all UEs of the same TSN Time Domain 1 select the same SMF to participate in communication. In this way, the SMF can instruct the UPF of UE1 to transmit data to a Protocol Data Unit (PDU) Session of UE2 (referring to FIG. 3, UE1 and UE2 are connected to the same UPF), or the SMF can instruct UPF1 of UE1 to transmit data to UPF2 of UE2 (referring to FIG. 4, UE1 and UE2 are respectively connected to different UPFs). By the method provided in the embodiments of the present disclosure, the same SMF can be selected for different UEs.

Figure 5:
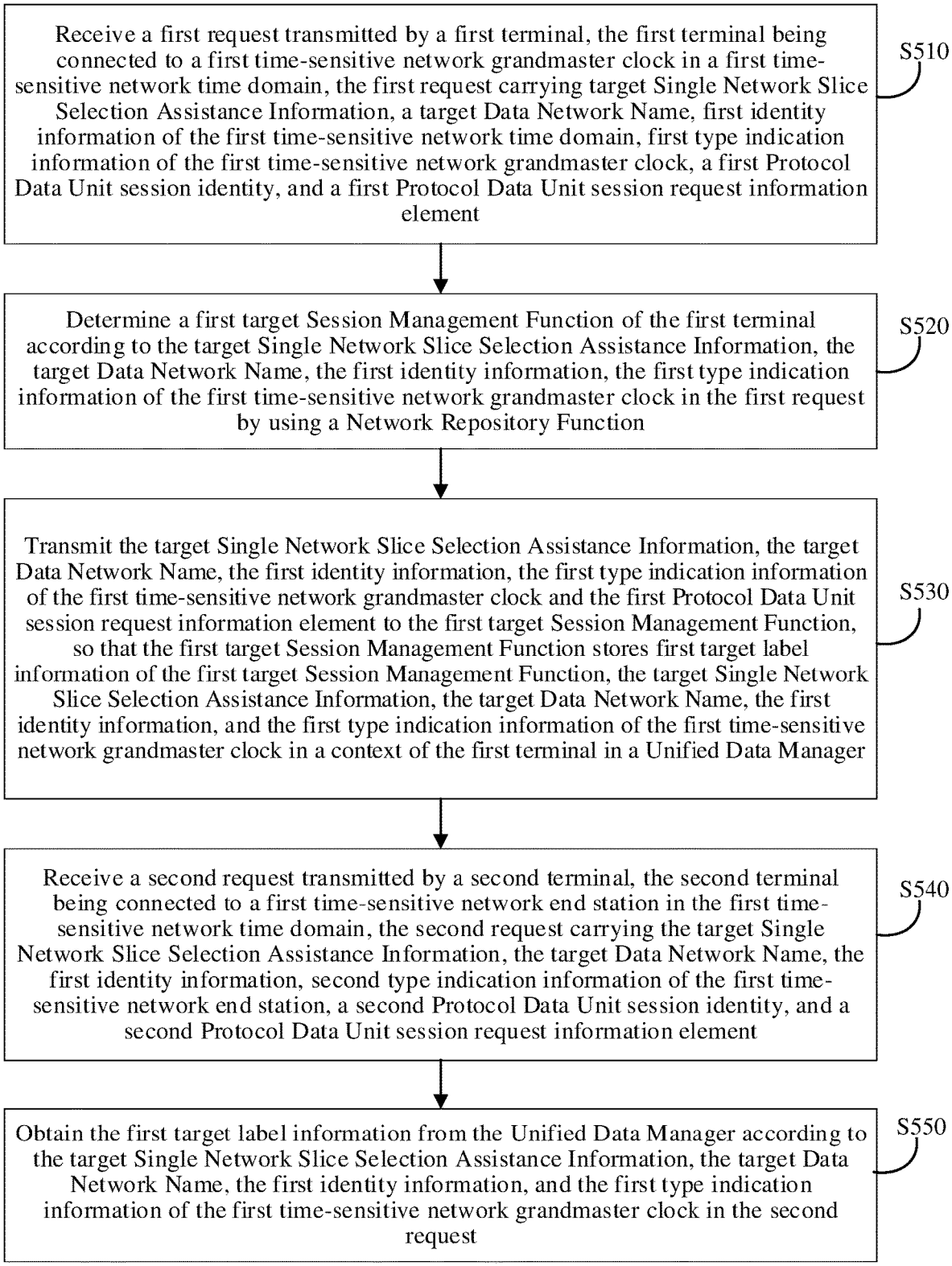
FIG. 5 is a schematic flowchart of a method for implementing time synchronization according to an embodiment of the present disclosure.

FIG. 5 is a schematic flowchart of a method for implementing time synchronization according to an embodiment of the present disclosure. In the embodiments of the present disclosure, the method may be performed by an AMF or an SCP. An AMF is used as an example for description below. This is one example embodiment. As shown in FIG. 5, the method provided in the embodiments of the present disclosure may include the following steps:

Step S510: Receive a first request transmitted by a first terminal (represented by UE1 in the following embodiments), the first terminal being connected to a first time-sensitive network grandmaster clock (represented by TSN GM 1 in the following embodiments) in a first time-sensitive network time domain (represented by TSN Time Domain 1 in the following embodiments), the first request comprising target Single Network Slice Selection Assistance Information (S-NSSAI), a target Data Network Name (DNN), first identity information (TSN Time Domain 1 identity, Time Domain 1 ID for short below) of the first time-sensitive network time domain, first type indication information (Time GM Source Indication) of the first time-sensitive network grandmaster clock, a first Protocol Data Unit session identity (PDU Session ID), and a first Protocol Data Unit session request information element.

Figure 6:
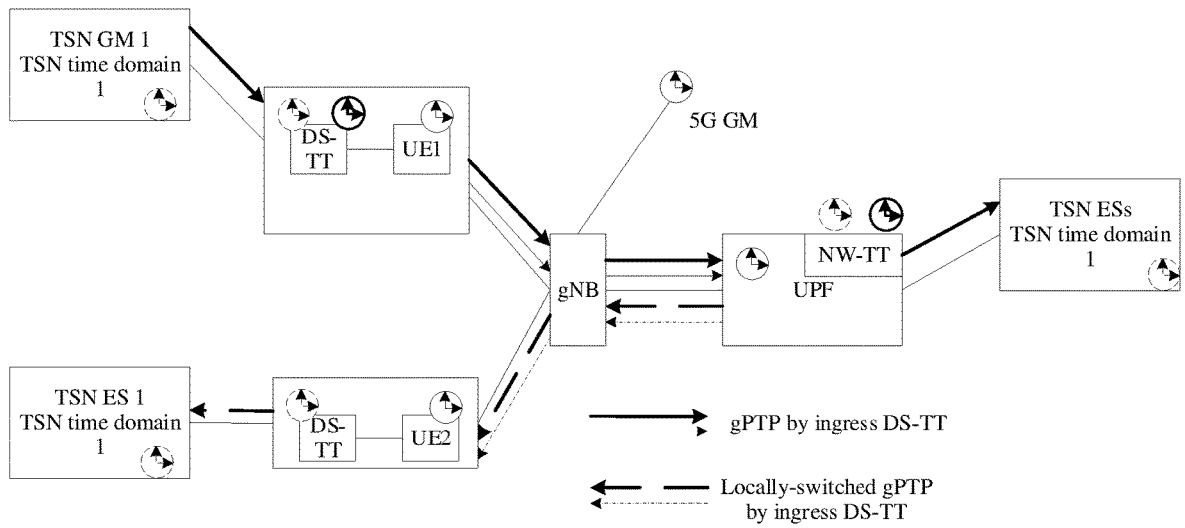
FIG. 6 is a schematic architectural diagram of time synchronization according to an embodiment of the present disclosure.
Figure 7:
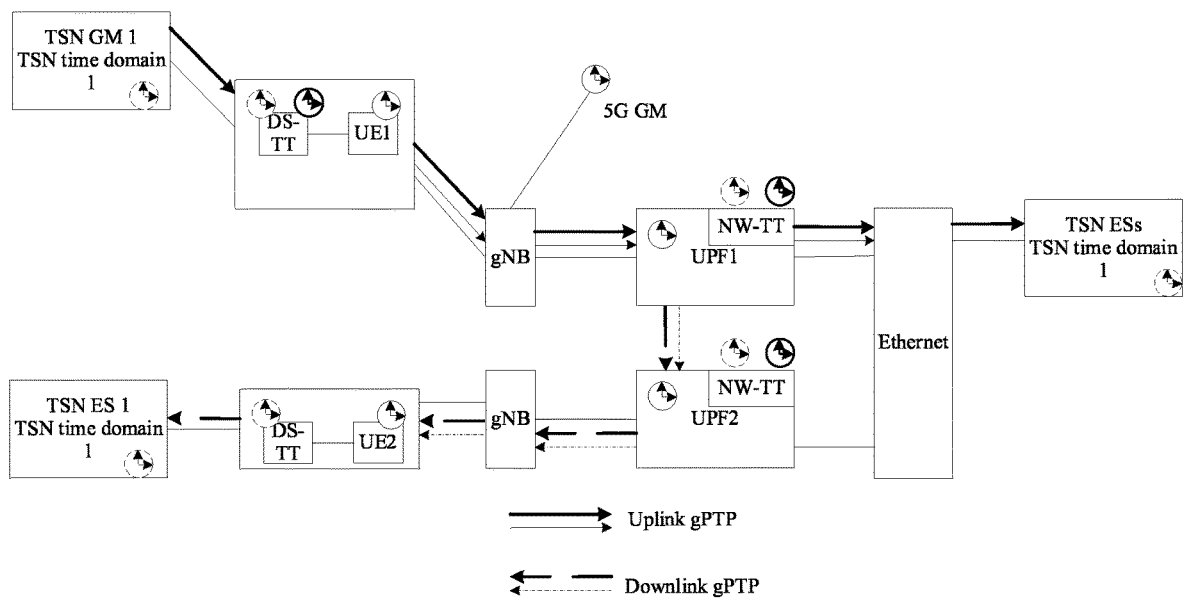
FIG. 7 is a schematic architectural diagram of time synchronization according to an embodiment of the present disclosure.

For example, in the embodiments in FIG. 6 and FIG. 7, UE1 is connected to a TSN GM 1 of a TSN Time Domain 1 by a DS-TT of UE1. The Time GM Source Indication of the first time-sensitive network grandmaster clock is used for indicating that UE1 is connected to the TSN GM rather than an ES.

Step S520: Determine a first target Session Management Function (SMF) of the first terminal according to the target Single Network Slice Selection Assistance Information, the target Data Network Name, the first identity information, the first type indication information of the first time-sensitive network grandmaster clock in the first request by using a Network Repository Function (NRF).

In an example embodiment, the determining a first target Session Management Function of the first terminal according to the target Single Network Slice Selection Assistance Information, the target Data Network Name, the first identity information, the first type indication information of the first time-sensitive network grandmaster clock in the first request by using a Network Repository Function may include: determining, according to the first type indication information of the first time-sensitive network grandmaster clock, to use the Network Repository Function to select the first target Session Management Function of the first terminal; providing the target Single Network Slice Selection Assistance Information, the target Data Network Name, and the first identity information to the Network Repository Function; and receiving first target label information of the first target Session Management Function determined by the Network Repository Function according to the target Single Network Slice Selection Assistance Information, the target Data Network Name, and the first identity information.

Step S530: Transmit the target Single Network Slice Selection Assistance Information, the target Data Network Name, the first identity information, the first type indication information of the first time-sensitive network grandmaster clock and the first Protocol Data Unit session request information element to the first target Session Management Function, so that the first target Session Management Function stores first target label information of the first target Session Management Function, the target Single Network Slice Selection Assistance Information, the target Data Network Name, the first identity information, and the first type indication information of the first time-sensitive network grandmaster clock in the first terminal in a Unified Data Manager (UDM).

In an example embodiment, the transmitting the target Single Network Slice Selection Assistance Information, the target Data Network Name, the first identity information, the first type indication information of the first time-sensitive network grandmaster clock and the first Protocol Data Unit session request information element to the first target Session Management Function, so that the first target Session Management Function stores the first target label information of the first target Session Management Function, the target Single Network Slice Selection Assistance Information, the target Data Network Name, the first identity information, and the first type indication information of the first time-sensitive network grandmaster clock in the first terminal in a Unified Data Manager includes: transmitting the target Single Network Slice Selection Assistance Information, the target Data Network Name, the first identity information, the first type indication information of the first time-sensitive network grandmaster clock and the first Protocol Data Unit session request information element to the first target Session Management Function; and transmitting, by the first target Session Management Function, a registration request to the Unified Data Manager, the registration request including the target Single Network Slice Selection Assistance Information, the target Data Network Name, the first target label information, the first identity information, and the first type indication information of the first time-sensitive network grandmaster clock.

Step S540: Receive a second request transmitted by a second terminal (represented by UE2 below), the second terminal being connected to a first time-sensitive network end station (represented by a TSN ES 1 below) in the first time-sensitive network time domain, the second request comprising the target Single Network Slice Selection Assistance Information, the target Data Network Name, the first identity information, second type indication information (represented by Time End Station Indication below) of the first time-sensitive network end station, a second Protocol Data Unit session identity, and a second Protocol Data Unit session request information element.

For example, in the embodiments in FIG. 6 and FIG. 7, UE2 is connected to a TSN ES 1 of a TSN Time Domain 1 by a DS-TT of UE2. The Time End Station Indication of the TSN ES 1 is used for indicating that UE2 is connected to the TSN ES rather than the TSN GM.

The above embodiments are examples and include the foregoing Time GM Source Indication used for indicating that UE1 is connected to the TSN GM and the foregoing Time End Station Indication used for indicating that UE2 is connected to the TSN ES. For example, any following manner may be used:

1) If the Time GM Source Indication is used for indicating that the corresponding UE is connected to the TSN GM, the Time End Station Indication above may use Time End Station Indication=1 to indicate that the corresponding UE is connected to the TSN GM and use Time End Station Indication=0 to indicate that the corresponding UE is connected to the TSN ES.
2) If the parameter Time End Station Indication is present, it indicates that the corresponding UE is connected to the TSN GM, and if the parameter Time End Station Indication is absent, it indicates that the corresponding UE is connected to the TSN ES.
3) If the parameter Time End Station Indication is present (and has a specific value), it indicates that the corresponding UE is connected to the TSN GM. If the parameter Time End Station Indication is present (and has another specific value), it indicates that the corresponding UE is connected to the TSN ES.
4) A new parameter TSN Type is set. It is assumed that TSN Type=1 indicates that the corresponding UE is connected to the TSN GM, and TSN Type=0 indicates that the corresponding UE is connected to the TSN ES.

Step S550: Obtain the first target label information from the Unified Data Manager according to the target Single Network Slice Selection Assistance Information, the target Data Network Name, the first identity information, and the first type indication information of the first time-sensitive network grandmaster clock in the second request.

In an example embodiment, the obtaining the first target label information from the Unified Data Manager according to the target Single Network Slice Selection Assistance Information, the target Data Network Name, the first identity information, and the first type indication information of the first time-sensitive network grandmaster clock in the second request may include: determining, according to the second type indication information of the first time-sensitive network end station, to use the Unified Data Manager to query a first target Session Management Function of the second terminal; transmitting a parameter configuration obtaining request to the Unified Data Manager, the parameter configuration obtaining request including the target Single Network Slice Selection Assistance Information, the target Data Network Name, the first identity information, and the first type indication information of the first time-sensitive network grandmaster clock; and receiving a parameter configuration obtaining response returned by the Unified Data Manager according to the target Single Network Slice Selection Assistance Information, the target Data Network Name, the first identity information, and the first type indication information of the first time-sensitive network grandmaster clock, the parameter configuration obtaining response including the first target label information.

In an example embodiment, the method may further include: storing the target Single Network Slice Selection Assistance Information, the target Data Network Name, the first target label information of the first target Session Management Function, the first identity information, and the second type indication information of the first time-sensitive network end station in the second terminal in the Unified Data Manager by using the first target Session Management Function.

In the standard in the related art, SMF selection is completed by the AMF through the NRF, and basic parameters for the AMF to select an SMF are the S-NSSAI and the DNN.

It is proposed in the embodiments of the present disclosure that for UE1 connected to the TSN GM 1, the basic parameters for the AMF to select an SMF are changed to the S-NSSAI, the DNN, the TSN Time domain 1 ID, and the Time GM Source Indication For example, when UE1 connected to the TSN GM 1 of the TSN Time Domain 1 establishes a PDU Session, a UL Non-Access Stratum (NAS) message (that is, the first request) transmitted by UE1 includes the target S-NSSAI, the target DNN, the first PDU Session ID, the TSN Time Domain 1 ID, and the Time GM Source Indication of the TSN GM 1, so that the AMF may observe or perceive these parameters.

The AMF may acquire, according to the Time GM Source Indication of the TSN GM 1 in the first request, that UE1 transmitting the first request is connected to the TSN GM. In this case, the AMF may determine to use the NRF to select the SMF of UE1. In some embodiments, the AMF may use the parameters S-NSSAI, DNN, PDU Session ID, and TSN Time Domain 1 ID in the first request to make the NRF select an SMF as the first target SMF (SMF1) and acquire the first target label information (identity, ID) of the SMF1. The SMF of the PDU Session of UE1 is registered with the UDM. A registration message and data stored in the UDM include the target S-NSSAI, the target DNN, the first PDU Session ID, the SMF1 ID, an Access Type, the TSN Time Domain 1 ID, and the Time GM Source Indication of the TSN GM 1.

When UE2 connected to the TSN ES 1 receiving a time synchronization message of the TSN Time Domain 1 establishes a PDU Session, a UL NAS message (that is, the second request) transmitted by UE2 needs to include the target S-NSSAI, the target DNN, the second PDU Session ID, the TSN Time Domain 1 ID, and the Time End Station Indication of the TSN ES 1, so that the AMF may observe or perceive these parameters.

The target S-NSSAI, the target DNN, and the TSN Time Domain 1 ID of UE2 all respectively have the same values as the target S-NSSAI, the target DNN, and the TSN Time Domain 1 ID of UE1 connected to the TSN GM 1. The first PDU Session ID and the second PDU Session ID are values respectively assigned by UE1 and UE2 and are only significant to respective UEs.

When selecting an SMF, the AMF of UE2 determines, according to the identity Time End Station Indication, that the UDM rather than the NRF is to be used to select an SMF ID of the SMF. The AMF provides the parameters target S-NSSAI, target DNN, TSN Time domain 1 ID, and the Time GM Source Indication of the TSN GM 1 to the UDM, so that the UDM may find the SMF1 ID of UE1 and provide the SMF1 ID to the AMF of UE2, thereby implementing that UE2 selects the same SMF1 as UE1. The AMF of UE2 may continue with an establishment procedure of the PDU Session of UE2.

In an example embodiment, the method may further include: transmitting the target Single Network Slice Selection Assistance Information, the target Data Network Name, the first identity information, and the second Protocol Data Unit session request information element to the first target Session Management Function; obtaining, by the first target Session Management Function, a first User Plane Function of the first terminal according to the target Single Network Slice Selection Assistance Information, the target Data Network Name, and the first identity information; and when the first User Plane Function is connected to a base station corresponding to the second terminal, using, by the second terminal, the first User Plane Function.

For example, as shown in FIG. 6, in an establishment procedure of the PDU session of UE1, SMF1 may select a first UPF for UE1 according to the foregoing target S-NSSAI, target DNN, and Time Domain ID. In an establishment procedure of the PDU session of UE2, SMF1 may find the first UPF of UE1 according to the foregoing target S-NSSAI, target DNN, and Time Domain ID. In this case, it needs to be further determined whether the first UPF of UE1 may be connected to a base station of UE2. If the first UPF of UE1 may be connected to a base station of UE2, UE2 and UE1 may share one same UPF.

In an example embodiment, the method may further include: when the first User Plane Function is not connected to the base station corresponding to the second terminal, determining a second User Plane Function for the second terminal, the second User Plane Function being connected to the base station corresponding to the second terminal.

As shown in FIG. 7, in this case, the first UPF of UE1 is labeled as UPF1. If UPF1 of UE1 cannot be connected to a base station of UE2 in an actual case, for example, there is a relatively large physical distance between UPF1 and the base station of UE2, UPF2 needs to be selected for UE2 according to the foregoing target S-NSSAI, target DNN, and Time Domain ID, and UPF2 can be connected to the base station of UE2. In some embodiments, when selecting UPF2 for UE2, SMF1 may take the Time End Station Indication into consideration.

In an example embodiment, the method may further include: transmitting a first time synchronization message of the first time-sensitive network grandmaster clock by using a first Protocol Data Unit session corresponding to the first Protocol Data Unit session identity; transmitting the first time synchronization message to the second terminal by using the first target Session Management Function and using a second Protocol Data Unit session corresponding to the second Protocol Data Unit session identity; and transmitting the first time synchronization message to the first time-sensitive network end station by using the second terminal to implement time synchronization between the first time-sensitive network end station and the first time-sensitive network grandmaster clock.

For example, as shown in FIG. 6, the TSN GM 1 of the TSN Time Domain 1 transmits a first time synchronism message to UE1. The UE1 DS-TT records a receiving time of a UL data packet that includes the first time synchronization message, and adds the receiving time to the UL data packet. In addition, the value of the CorrectionField of the first time synchronization message in the UL data packet is updated to a sum of the original value of the CorrectionField and a transmission delay value between the UE1 DS-TT and the TSN GM 1. A transmission delay between the UE1 DS-TT and the TSN GM 1 may be obtained by using the method shown in FIG. 1 or in another manner. Then the UL data packet is transmitted to the UPF through the base station. The NW-TT of the UPF subtracts a receiving time added by the UE1 DS-TT to the UL data packet from the time at which the NW-TT receives the UL data packet, to obtain a transmission delay value of the UL data packet in the entire 5GS. The NW-TT adds the transmission delay value and a previous transmission time (in the CorrectionField of the received first time synchronization message) from the TSN GM to the UE1 DS-TT to obtain an updated transmission delay value. The updated transmission delay value is added to the CorrectionField of the first time synchronization message in the UL data packet. In addition, the receiving time added by the UE1 DS-TT is deleted. The NW-TT may transmit the updated UL data packet including the first time synchronism message to TSN ESs of the TSN Time Domain 1 on a side of the UPF/NW-TT. The TSN ESs of the TSN Time Domain 1 on the side of the UPF/NW-TT may add a time value carried in the first time synchronism message, the transmission delay value in the CorrectionField updated by the NW-TT, and transmission delay values between the TSN ESs and the NW-TT to obtain a calculated time value. Then the TSN ESs of the TSN Time Domain 1 on the side of the UPF/NW-TT set clocks of the TSN ESs to the calculated time value, so that time synchronization between the TSN ESs of the TSN Time Domain 1 on the side of the UPF/NW-TT and the TSN GM 1 may be implemented.

If the data packet including the first time synchronism message is transmitted to the TSN ES 1 of UE2 sharing the UPF, the data packet is not transmitted through the NW-TT. That is, the NW-TT of the UPF performs no processing. The UPF directly transmits the data packet to UE2 through a user plane of UE2, and then transmits the data packet to the UE2 DS-TT. In this case, operations of the UE2 DS-TT are very similar to the operations of the NW-TT when transmitting the data packet including the first time synchronism message to the TSN ESs. That is, the UE2 DS-TT subtracts the receiving time added by the UE1 DS-TT to the data packet from the time at which the UE2 DS-TT receives the data packet, to obtain a transmission delay value of the data packet in the entire 5GS. Then the transmission delay value and a previous transmission time (in the CorrectionField of the received first time synchronization message) from the TSN GM to the UE1 DS-TT are added to obtain an updated transmission delay value. The updated transmission delay value is added to the CorrectionField of the first time synchronization message in the data packet. In addition, the receiving time added by the UE1 DS-TT is deleted. The UE2 DS-TT may transmit the updated data packet including the first time synchronism message to the TSN ES 1 of the TSN Time Domain 1 on a side of UE2. The TSN ES 1 may add a time value carried in the first time synchronism message, the transmission delay value in the CorrectionField updated by the UE2 DS-TT, and a transmission delay value between the TSN ES 1 and the UE2 DS-TT to obtain a calculated time value. Then the TSN ES 1 sets a clock of the TSN ES 1 to the calculated time value, thereby implementing time synchronization between the TSN ES 1 of the TSN Time Domain 1 and the TSN GM 1.

In another example, in the embodiment shown in FIG. 7, the TSN GM 1 of the TSN Time Domain 1 transmits the first time synchronism message to UE1. The UE1 DS-TT records a receiving time of a UL data packet that includes the first time synchronization message, and adds the receiving time to the UL data packet. In addition, the value of the CorrectionField of the first time synchronization message in the UL data packet is updated to a sum of the original value of the CorrectionField and a transmission delay value between the UE1 DS-TT and the TSN GM 1. A transmission delay between the UE1 DS-TT and the TSN GM 1 may be obtained by using the method shown in FIG. 1 or in another manner. Then the UL data packet is transmitted to the UPF1 through the base station. If the UL data packet including the first time synchronism message is transmitted to the TSN ES 1 of UE2 and there is an N19 interface between UPF1 and UPF2, UPF1 transmits the UL data packet to UPF2 of UE2 through the N19 interface, then transmits the UL data packet to UE2 through the user plane of UE2, and finally transmits the UL data packet to the UE2 DS-TT. Because the UL data packet including the first time synchronism message does not pass through the NW-TT, neither the NW-TT of UPF1 nor the NW-TT of UPF2 performs any specific operation. In this case, the UE2 DS-TT subtracts a receiving time added by the UE1 DS-TT to the UL data packet from the time at which the UE2 DS-TT receives the UL data packet, to obtain a transmission delay value of the UL data packet in the entire 5GS. The transmission delay value and a previous transmission time (in the CorrectionField of the received first time synchronization message) from the TSN GM to the UE1 DS-TT are added to obtain an updated transmission delay value. The updated transmission delay value is added to the CorrectionField of the first time synchronization message in the UL data packet. In addition, the receiving time added by the UE1 DS-TT is deleted. The UE2 DS-TT may transmit the UL data packet added with the updated transmission delay value to the TSN ES 1 of the TSN Time Domain 1 on the side of UE2. The TSN ES 1 may add a time value carried in the first time synchronism message, the transmission delay value in the CorrectionField updated by the UE2 DS-TT, and a transmission delay value between the TSN ES 1 and the UE2 DS-TT to obtain a calculated time value. Then the TSN ES 1 sets a clock of the TSN ES 1 to the calculated time value, thereby implementing time synchronization between the TSN ES 1 of the TSN Time Domain 1 and the TSN GM 1.

In the embodiment shown in FIG. 7, the TSN GM 1 of the TSN Time Domain 1 transmits the first time synchronism message to the UE1. The UE1 DS-TT records a receiving time of a UL data packet that includes the first time synchronization message, and adds the receiving time to the UL data packet. In addition, the value of the CorrectionField of the first time synchronization message in the UL data packet is updated to a sum of the original value of the CorrectionField and a transmission delay value between the UE1 DS-TT and the TSN GM 1. A transmission delay between the UE1 DS-TT and the TSN GM 1 may be obtained by using the method shown in FIG. 1 or in another manner. Then the UL data packet is transmitted to the UPF1 through the base station. If the UL data packet including the first time synchronism message is transmitted to the TSN ES 1 of UE2 and there is no N19 interface between UPF1 and UPF2, the UPF1/NW-TT transmits the UL data packet to an external Ethernet through the N6 interface. Then the external Ethernet transmits the UL data packet to the UPF2/NW-TT of UE2. Then the UL data packet is transmitted to UE2 through the user plane of UE2, and finally is transmitted to the UE2 DS-TT. Because the UL data packet including the first time synchronism message passes through the NW-TT of UPF1 and the NW-TT of UPF2, related operations may be considered as a superimposition of two transfer processes. First, the NW-TT of UPF1 subtracts a receiving time added by the UE1 DS-TT to the UL data packet from the time at which the NW-TT of UPF1 receives the UL data packet, to obtain a transmission delay value of the UL data packet between UE1 and the UPF1 NW-TT. The transmission delay value and a previous transmission time (in the CorrectionField of the received first time synchronization message) from the TSN GM to the UE1 DS-TT are added to obtain an updated transmission delay value. The updated transmission delay value is added to the CorrectionField of the first time synchronization message in the UL data packet. In addition, the receiving time added by the UE1 DS-TT is deleted. Then the UL data packet is transmitted to an external Ethernet through the N6 interface. A bridge in the Ethernet also continues to update the CorrectionField of the first time synchronism message in the UL data packet to include the transmission delay of the UL data packet in the entire Ethernet. Then the UL data packet is transmitted to the NW-TT of UPF2 through the N6 interface. The NW-TT of UPF2 records the receiving time at which the UL data packet is received, and the receiving time is added to the UL data packet. In addition, the value of the CorrectionField of the first time synchronization message in the UL data packet is updated to a sum of the original value of the CorrectionField and a transmission delay value between the UPF2 NW-TT and a port of the Ethernet bridge transmitting the message to the UPF2 NW-TT. A transmission delay between the UPF2 NW-TT and the Port of the Ethernet bridge may be obtained by using the method shown in FIG. 1 or in another manner. Then the UL data packet including the first time synchronism message is transmitted to the UE2 DS-TT through the user plane of UE2. In this case, the UE2 DS-TT subtracts a receiving time added by the UPF2 NW-TT to the UL data packet from the time at which the UE2 DS-TT receives the UL data packet, to obtain a transmission delay value of the UL data packet between the UPF2 NW-TT and the UE2 DS-TT. The transmission delay value and the value of the CorrectionField of the first time synchronism message in the UL data packet are added to obtain a transmission delay value updated again. The transmission delay value updated again is added to the CorrectionField of the first time synchronization message in the UL data packet. In addition, the receiving time added by the UPF2 NW-TT is deleted. The UE2 DS-TT may transmit the UL data packet added with the transmission delay value updated again to the TSN ES 1 of the TSN Time Domain 1 on the side of UE2. The TSN ES 1 may add a time value carried in the first time synchronism message, the transmission delay value in the CorrectionField updated again by the UE2 DS-TT, and a transmission delay value between the TSN ES 1 and the UE2 DS-TT to obtain a calculated time value. Then the TSN ES 1 sets a clock of the TSN ES 1 to the calculated time value, thereby implementing time synchronization between the TSN ES 1 of the TSN Time Domain 1 and the TSN GM 1.

In a process of implementing time synchronization, the transmission delay of transmitting the first time synchronism message to the UE1 DS-TT by the TSN GM 1 and/or the transmission delay of transmitting the data packet including the first time synchronism message to the TSN ES 1 by the UE2 DS-TT is further considered. The transmission delays may be obtained in the manner in FIG. 1 or obtained in another manner.

In the method for implementing time synchronization provided in the embodiments of the present disclosure, first identity information of a first time-sensitive network time domain and first type indication information of a first time-sensitive network grandmaster clock are carried in a first request transmitted by a first terminal, so that it can be implemented that for the first terminal connected to the first time-sensitive network grandmaster clock, a first target Session Management Function of the first terminal is selected by using a Network Repository Function, and the first identity information of the first time-sensitive network time domain, the first type indication information of the first time-sensitive network grandmaster clock, and first target label information of the first target Session Management Function are stored in association in the first terminal in a Unified Data Manager by using the first target Session Management Function. When a second request transmitted by a second terminal connected to a first time-sensitive network end station in the first time-sensitive network time domain is received, the first target label information of the first target Session Management Function may be obtained from the Unified Data Manager according to the first identity information of the first time-sensitive network time domain and the first type indication information of the first time-sensitive network grandmaster clock, so that it can be implemented that the first terminal and the second terminal select the same first target Session Management Function. After the first terminal and the second terminal select the same first target Session Management Function, the first target Session Management Function may be used for time synchronism between the first time-sensitive network grandmaster clock in the first time-sensitive network time domain connected to the first terminal and the first time-sensitive network end station in the first time-sensitive network time domain connected to the second terminal.

According to the 3GPP specifications, a PDU Session management procedure of UE may include a PDU Session Establishment procedure, a PDU Session Modification procedure, and a PDU Session Release procedure.

Figure 8:
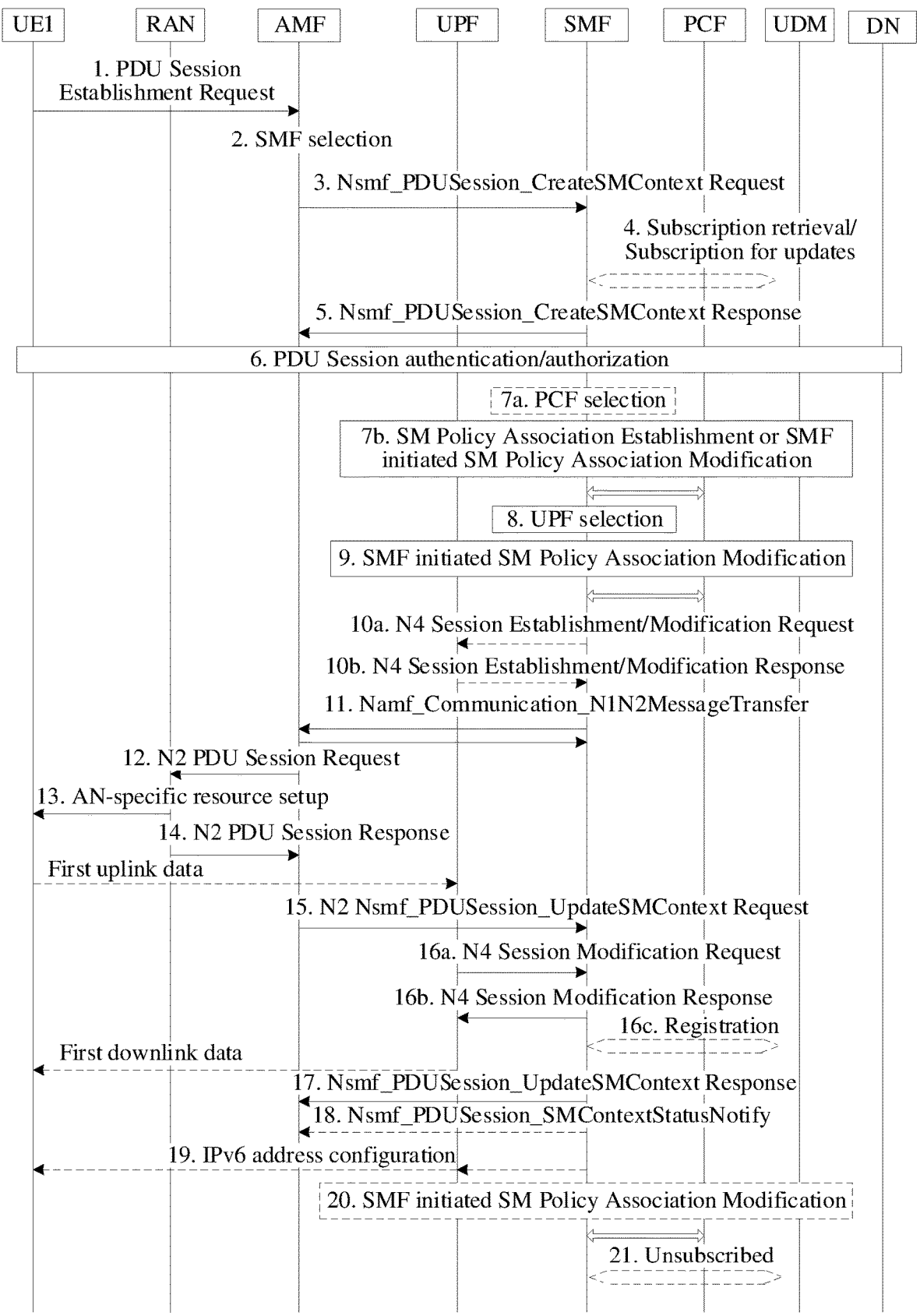
FIG. 8 is a schematic overall flowchart of a PDU Session Establishment procedure of UE1 connected to a TSN GM according to an embodiment of the present disclosure.

FIG. 8 is a schematic overall flowchart of a PDU Session Establishment procedure of UE1 connected to a TSN GM according to an embodiment of the present disclosure.

An AMF in FIG. 8 is responsible for mobility management and is connected to UE and a RAN. An SMF is responsible for session management and is connected to the AMF and a UPF. A Policy Control Function (PCF) is responsible for policy control and is connected to the SMF. A UDM is configured to perform unified management on service data. A data network (DN) is provided.

As shown in FIG. 8, UE1 requests to establish a PDU session used for non-roaming and roaming with local breakout (UE-requested PDU Session Establishment for non-roaming and roaming with local breakout). In the procedure, it is assumed that UE1 has been registered with the AMF. Therefore, unless UE1 uses emergency registration, the AMF has retrieved user subscription data from the UDM. The embodiment in FIG. 8 may include the following steps:

Step 1: From UE1 to the AMF: Transmit a NAS message. The NAS message carries an S-NSSAI(s) (the foregoing target S-NSSAI here), a UE Requested DNN (a DNN requested by UE1 here, that is, a first target data network name), a PDU Session ID (a first Protocol Data Unit session identity here), a Request Type, a TSN Time Domain 1 ID, a Time GM Source Indication, an Old PDU Session ID, and an N1 SM container (a PDU Session Establishment Request (a first Protocol Data Unit session establishment request here), [a Port Management Information Container]). An N1 Session Management (SM) container is a first Protocol Data Unit session request information element. The AMF may not know that it is a first Protocol Data Unit session establishment request message but may know that it is a request message of a first PDU session.

To establish a new PDU Session, UE1 generates a new PDU Session ID, that is, the foregoing UE Requested DNN.

UE1 transmits a NAS message to initiate a PDU Session establishment procedure requested by UE1. The NAS message includes a PDU Session Establishment Request in the N1 SM container. The PDU Session Establishment Request includes a PDU session ID, a type of a requested PDU session, and the like.

If the PDU Session Establishment Request is a request for establishing a new PDU session, the Request Type indicates "Initial request". If the request indicates an existing PDU session handover between 3GPP access and non-3GPP access or indicates a PDU Session handover from an existing Public data network (PDN) connection in an Evolved Packet Core (EPC), the Request Type indicates "Existing PDU Session".

When an emergency service is required and one emergency PDU session is not established, UE1 is required to initiate a PDU Session Establishment procedure requested by UE1, the Request Type of the emergency PDU session indicates "Emergency Request". If the request indicates an existing PDU session handover for an emergency service between 3GPP access and non-3GPP access or indicates a PDU Session handover for an emergency service from an existing Public data network (PDN) connection in an Evolved Packet Core (EPC), the Request Type indicates "Existing Emergency PDU Session".

UE1 includes S-NSSAI of allowed NSSAI from a current access type. If an operation of a Session and Service Continuity Mode (SSC) mode 3 triggers the procedure, UE1 further adds an old PDU session ID to the NAS message. The old PDU session ID indicates that a PDU session ID of a current PDU session needs to be released. The old PDU session ID is only included in this case.

The Port Management Information Container is received from the DS-TT, including a port management information function, for example, information for indicating which standardization the DS-TT supports and deployment-specific port management information, as defined in Clause 5.28.3 of TS 23.501 of the 3GPP protocol.

Step 2: The AMF selects an SMF as a first target Session Management Function.

In the embodiments of the present disclosure, the AMF/SCP performs SMF discovery and selection. An SMF selection function is supported by the AMF and the SCP and is used for assigning an SMF for managing a PDU session.

In the embodiments of the present disclosure, the following factors may be considered in an SMF selection procedure:

a) Selected Data Network Name in the case of home routed roaming. A DNN is not used for selecting a visited-SMF (V-SMF).
b) S-NSSAI (for a non-roaming and home-routed roaming scenario) of a Home Public Land Mobile Network (HPLMN) and S-NSSAI (for a roaming with local breakout and home-routed roaming scenario) of a Visited Public Land Mobile Network (VPLMN).
c) Network slice instance-identifier (NSI-ID).

The use of the NSI-ID may be optional in the network, depending on a deployment choice of an operator. If the NSI-ID is used, the NSI-ID is associated with the S-NSSAI.

d) An access technology being used by UE1.
e) Support of Control Plane CIoT 5GS optimization.
f) Subscription information from the UDM, for example:
Each DNN: Whether LBO roaming is allowed.
Each piece of S-NSSAI: Subscribed DNN(s).
Each piece of (S-NSSAI and a subscribed DNN): Whether LBO roaming is allowed.
Each piece of (S-NSSAI and a subscribed DNN): Whether interworking with an EPC is allowed.
Each piece of (S-NSSAI and a subscribed DNN): Whether the same SMF needs to be selected for all PDU sessions with the same S-NSSAI and DNN.
g) Void.
h) Local operator policies.

In these policies, it may be considered whether an SMF that needs to be selected is an intermediate-SMF (I-SMF) or a visited-SMF (V-SMF) or an SMF.

i) Load condition of a candidate SMF.
j) If a Network Data Analytics Function (NWDAF) is deployed, candidate SMF load analysis (that is, statistics or prediction) received from the NWDAF further needs to be considered (See TS 23.288).
k) UE location (for example, a Tracking Area (TA)). A TA is a concept newly formulated for location management of UE in a Long Term Evolution (LTE)/System Architecture Evolution (SAE) system, and is defined as a free movement area in which UE does not require an update service.
l) A serving area with candidate SMFs.
m) A capability of supporting a MA PDU (a PDU session that supports a PDU connection service, and may use one access network at once or may simultaneously use one 3GPP access network and one non-3GPP access network) session by an SMF.
n) If interworking with an Evolved Package System (EPS) is required.
o) A TSN Time Domain ID.

The TSN Time Domain ID is a parameter newly added in the embodiments of the present disclosure and used for indicating which TSN time domain (for example, the foregoing TSN Time Domain 1 ID) or which TSN time domains (for example, in this case, the TSN time domains correspond to a List (an TSN Time Domain ID) below) are connected to UE (for example, the foregoing UE1) corresponding to an SMF selected for a PDU session p) A Time GM Source Indication (for example, the Time GM Source Indication of the TSN GM 1 of the foregoing TSN Time Domain 1) or a Time End Station Indication.

The Time GM Source Indication or the Time End Station Indication is another parameter newly added in the embodiments of the present disclosure. The Time GM Source Indication is used for indicating that a time-sensitive network grandmaster clock rather than a first time-sensitive network end station is connected to UE (for example, the foregoing UE1) corresponding to an SMF selected for a PDU session. The Time End Station Indication is used for indicating that a time-sensitive network end station rather than a first time-sensitive network grandmaster clock is connected to UE (for example, the foregoing UE2) corresponding to an SMF selected for a PDU session. For the same UE, the Time GM Source Indication and the Time End Station Indication do not appear simultaneously.

In the embodiments of the present disclosure, a first request transmitted by UE1 carries p) Time GM Source Indication, indicating that UE1 is connected to the TSN GM. In this case, the AMF or the SCP discovers an SMF by using an NRF. It is assumed that SMF1 is determined, an SMF in the following steps means SMF1.

Step 3: From the AMF to the SMF: Transmit a Nsmf_PDUSession_CreateSMContext Request (a SUPI, a selected DNN, a UE requested DNN, S-NSSAI(s), a PDU Session ID, a TSN Time Domain 1 ID, a Time GM Source Indication, an AMF ID, a Request Type, a PCF ID, Priority Access, [a Small Data Rate Control Status], an N1 SM container (a PDU Session Establishment Request), User location information, an Access Type, a Radio Access Technology (RAT) Type, a PEI, a GPSI, UE presence in a LADN service area, Subscription For PDU Session Status Notification, a DNN Selection Mode, Trace Requirements, Control Plane CIoT 5GS Optimization indication, or a Control Plane Only indicator). Compared with the related art, in a relay manner, two parameters the TSN Time Domain 1 ID and the Time GM Source Indication are newly added to parameters transmitted to the SMF by the AMF.

The Subscription Permanent Identifier (SUPI) is a permanent identifier of a user in a 5GS. PEI represents a Permanent Equipment Identifier. GPSI represents a Generic Public Subscription Identifier. LADN represents a Local Area Data Network. CIoT represents a Cellular Internet of things.

The AMF transmits the S-NSSAI to the SMF. The AMF ID is a GUAMI of UE and uniquely identifies an AMF serving the UE. The AMF forwards together a PDU session ID and an N1 SM container including the PDU Session Establishment Request received from the UE.

Step 4: If Session Management Subscription data corresponding to the SUPI, the DNN, and the S-NSSAI of the HPLMN is unusable, the SMF retrieves/updates session management subscription data (subscription retrieval/subscription for updates).

Step 5: Transmit a Nsmf_PDUSession_CreateSMContext Response from the SMF to the AMF.

Step 6: Perform PDU session authentication/authorization, for example, optional auxiliary authentication/authorization.

Step 7*a*: If dynamic Policy Control and Charging (PCC) is used for the PDU session, the SMF performs PCF selection according to the description of Clause 6.3.7.1 of TS 23.501.

Step 7*b*: The SMF may perform an SM Policy Association Establishment procedure defined in Clause 4.16.4 of TS 23.501 to establish SM Policy Association with the PCF, and obtain a default PCC rule of the PDU session. If the Request Type in the foregoing step 3 indicates "existing PDU session", the SMF may provide information about a policy control request trigger condition that an SMF initiated SM Policy Association Modification procedure satisfies.

Step 8: The SMF selects one or more required UPFs. The SMF may select one UPF to support an NW-TT function (for example, based on a requested DNN/S-NSSAI).

Step 9: The SMF may perform the SMF initiated SM Policy Association Modification procedure, to provide information about a policy control request trigger condition that is satisfied.

Step 10: If the Request Type indicates "initial request", the SMF uses the selected UPF to initiate an N4 Session Establishment procedure, or otherwise use the selected UPF to initiate an N4 Session Modification procedure.

Step 10a: The SMF transmits an N4 Session Establishment/Modification Request to the UPF.

Step 10b: The UPF transmits an N4 Session Establishment/Modification Response to the SMF to acknowledge that the N4 Session Establishment/Modification Request is received.

Step 11: The SMF transmits Namf_Communication_N1N2MessageTransfer to the AMF.

Step 12: The AMF transmits an N2 PDU Session Request (a NAS msg) (msg is short for message) to the RAN.

Step 13: The RAN transmits AN-specific resource setup (PDUSession Establishment Accept) to the UE.

Step 14: The RAN transmits an N2 PDU Session Response to the AMF.

Step 15: The AMF transmits an Nsmf_PDUSession_UpdateSMContext Request to the SMF.

Step 16a: The SMF initiates an N4 Session Modification procedure with the UPF.

Step 16b: The UPF provides an N4 Session Modification Response to the SMF.

After this step, the UPF transmits any DL data packet that has been cached for the PDU session to the UE1.

Step 16c: If Request Type in step 3 indicates neither "Emergency Request" nor "Existing Emergency PDU Session" and the SMF has not been registered for the PDU Session, the SMF registers with the UDM for the given PDU session to use Nudm_UECM_Registration (the SUPI, the DNN, the S-NSSAI, the PDU Session ID, the TSN Time Domain 1 ID, the Time GM Source Indication, and the SMF ID). Therefore, the UDM stores the following information: the SUPI, the SMF identity and the related DNN, the S-NSSAI, the PDU Session ID and the TSN Time Domain 1 ID, and the Time GM Source Indication. That is, when SMF1 registers its SMF1 ID and the PDU Session ID in the UDM, two parameters the TSN Time Domain 1 ID and the Time GM Source Indication are newly added.

Step 17: The SMF transmits an Nsmf_PDUSession_UpdateSMContext Response to the AMF.

Step 18: The SMF transmits Nsmf_PDUSession_SMContextStatusNotify to the AMF.

Step 19: The SMF performs transmission to the UE: In the case of PDU Session Type IPv6 or IPv4v6, the SMF generates an IPv6 Router Advertisement and transmits the IPv6 Router Advertisement to the UE1. If Control Plane CIoT 5GS optimization has been enabled for the PDU session, the SMF transmits the IPv6 Router Advertisement through the AMF, to transmit the IPv6 Router Advertisement to UE1 through Mobile Terminated Data Transport in a Control Plane CIoT 5GS optimization procedure, or otherwise the SMF transmits the IPv6 Router Advertisement through N4 and the UPF.

Step 20: SMF initiated SM Policy Association Modification.

Step 21: If the PDU session fails to be established after step 4, the SMF performs the following operations: If the SMF no longer process the PDU session of the UE, the SMF unsubscribes modification of session management subscription data.

For other examples, reference may be made to the description about FIG. 4.3.2.2.1-1 of TS23.502 of the 3GPP protocol.

A PDU Session establishment procedure of UE2 connected to a TSN ES 1 is similar to that in FIG. 8, and a difference lies in that in the foregoing step 1, from UE2 to the AMF: Transmit a NAS message. The NAS message carries (S-NSSAI(s), a UE Requested DNN, a PDU Session ID (a second PDU Session ID here), Request Type, a TSN Time Domain 1 ID, a Time End Station Indication, an Old PDU Session ID, an N1 SM container (PDU Session Establishment Request (a second PDU Session Establishment Request here), [Port Management Information Container]).

In the foregoing step 2, the second request transmitted by UE2 carries p) Time End Station Indication to indicate that UE2 is connected to a TSN End Station, and the AMF or SCP uses the UDM to perform SMF Discovery and mainly uses the foregoing parameters a), b), and o) to perform discovery of the SMF ID (for example, an SMF1 ID here).

The AMF may use the following two manners to query an SMF ID through the UDM. In one manner, the AMF obtains the Time GM Source Indication of the TSN GM 1 of the TSN Time Domain 1, and then transmits the target S-NSSAI, the target DNN, the TSN Time Domain 1 ID, and the Time GM Source Indication to the UDM. The UDM may, for example, search for the SMF ID by using a database SQL. In the other manner, the AMF transmits the target S-NSSAI, the target DNN, and the TSN Time Domain 1 ID to the UDM. The UDM obtains the Time GM Source Indication of the TSN GM 1 of the TSN Time Domain 1. Then the UDM searches for the SMF ID according to the target S-NSSAI, the target DNN, the TSN Time Domain 1 ID, and the Time GM Source Indication. In the foregoing example description, the former manner is used as an example for description.

In Step 3, for UE2, from the AMF to the SMF: Transmit a Nsmf_PDUSession_CreateSMContext Request (a SUPI, a selected DNN, a UE requested DNN, S-NSSAI(s), a PDU Session ID, a TSN Time Domain 1 ID, a Time End Station Source Indication, an AMF ID, a Request Type, a PCF ID, Priority Access, [a Small Data Rate Control Status], an N1 SM container (a PDU Session Establishment Request), User location information, an Access Type, an RAT Type, a PEI, a GPSI, UE presence in a LADN service area, Subscription For PDU Session Status Notification, a DNN Selection Mode, Trace Requirements, Control Plane CIoT 5GS Optimization indication, or a Control Plane Only indicator). Compared with the related art, in a relay manner, two parameters the TSN Time Domain 1 ID and the Time End Station Indication are newly added to parameters transmitted to the SMF by the AMF.

In the foregoing step 16c, for UE2, the SMF registers with the UDM for a given PDU session, and uses Nudm_UECM_Registration (the SUPI, the DNN, the S-NSSAI, the PDU Session ID, the TSN Time Domain 1 ID, the Time End Station Indication, and the SMF ID). Therefore, the UDM stores the following information: the SUPI, the SMF identity and the related DNN, the S-NSSAI, the PDU Session ID and the TSN Time Domain 1 ID, and the Time End Station Indication. That is, when SMF1 registers its SMF1 ID and the PDU Session ID in the UDM, two parameters the TSN Time Domain 1 ID and the Time End Station Indication are newly added.

Figure 9:
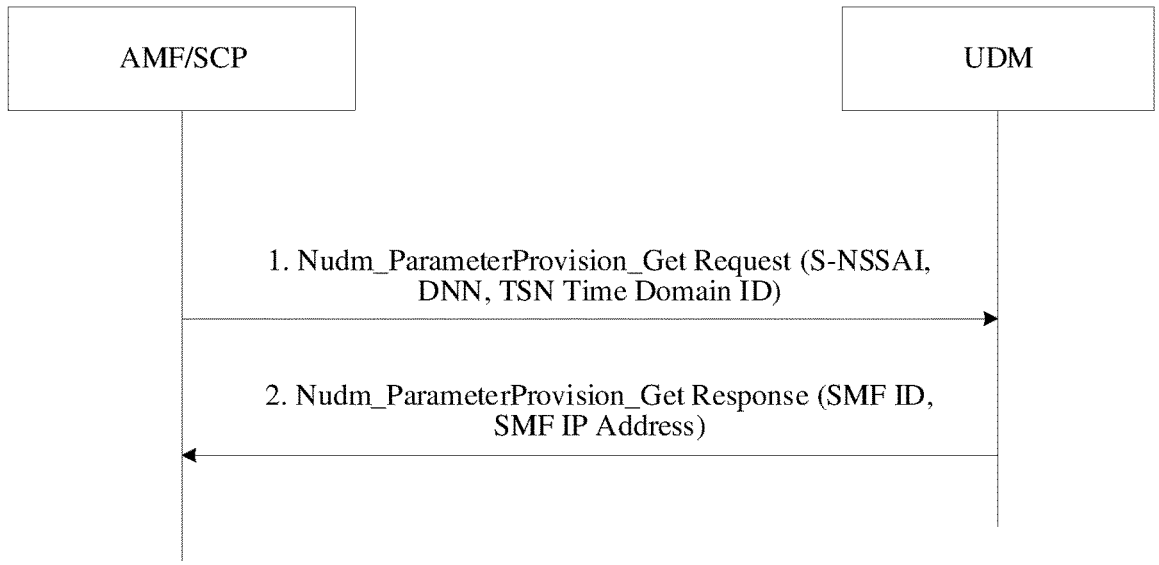
FIG. 9 is a schematic diagram of providing an SMF ID to an AMF/SCP by a UDM according to an embodiment of the present disclosure.

FIG. 9 is a schematic diagram of providing an SMF ID to an AMF/SCP by a UDM according to an embodiment of the present disclosure.

As shown in FIG. 9, a Nudm_ParameterProvision_Get Request is a parameter configuration obtaining request, and a Nudm_ParameterProvision_Get Response is a parameter configuration obtaining response. When the AMF or the SCP queries the SMF ID through the Nudm_Parameter-Provision_Get Request (the S-NSSAI, the DNN, and the TSN Time Domain), the UDM provides the SMF Identity, that is, the Nudm_ParameterProvision_Get Response (the SMF Identity, the SMF IP Address), previously registered with the UDM through the Nudm_UECM_Registration (the SUPI, the DNN, the S-NSSAI, the PDU Session ID, the SMF Identity, the TSN Time Domain ID, and the Time GM Source Indication). The SMF Internet Protocol (IP) Address refers to an IP address of the SMF.

The Nudm_ParameterProvision_Get Request (the S-NSSAI, the DNN and the TSN Time Domain) and the Nudm_ParameterProvision_Get Response (the SMF Identity and the SMF IP Address) are new functions provided in the embodiments of the present disclosure.

Figure 10:
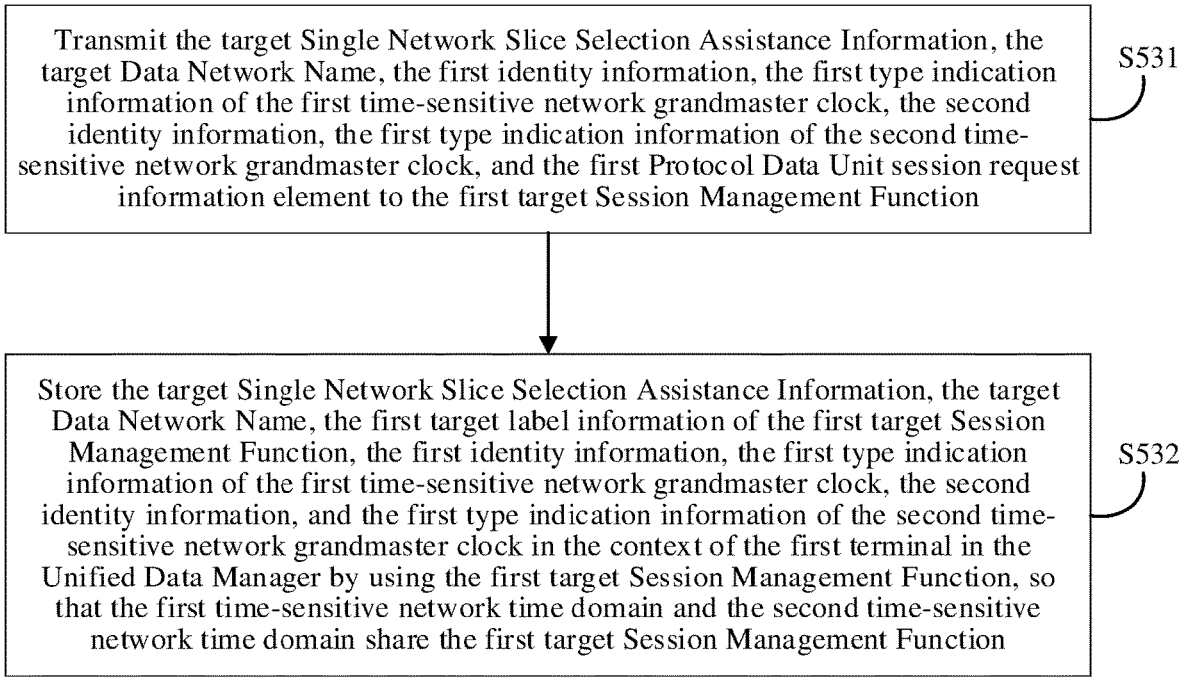
FIG. 10 is a schematic processing flowchart of an embodiment of step S530 in FIG. 3.

FIG. 10 is a schematic processing flowchart of an embodiment of step S530 in FIG. 3. In the embodiments of the present disclosure, the first terminal is further connected to a second time-sensitive network grandmaster clock in a second time-sensitive network time domain, and the first request further includes second identity information of the second time-sensitive network time domain and first type indication information of the second time-sensitive network grandmaster clock.

Figure 11:
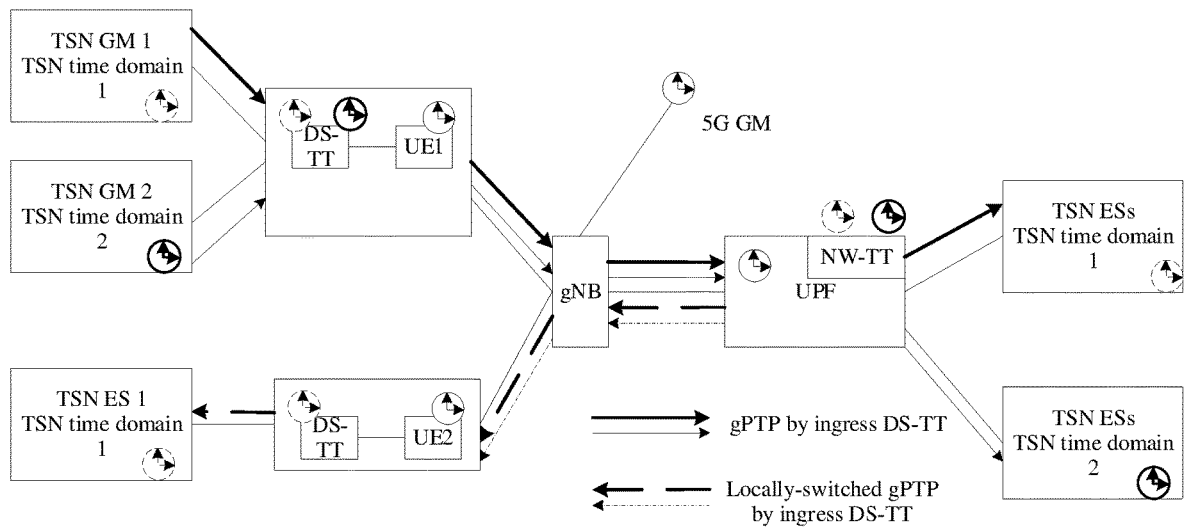
FIG. 11 is a schematic architectural diagram of time synchronization according to an embodiment of the present disclosure.
Figure 12:
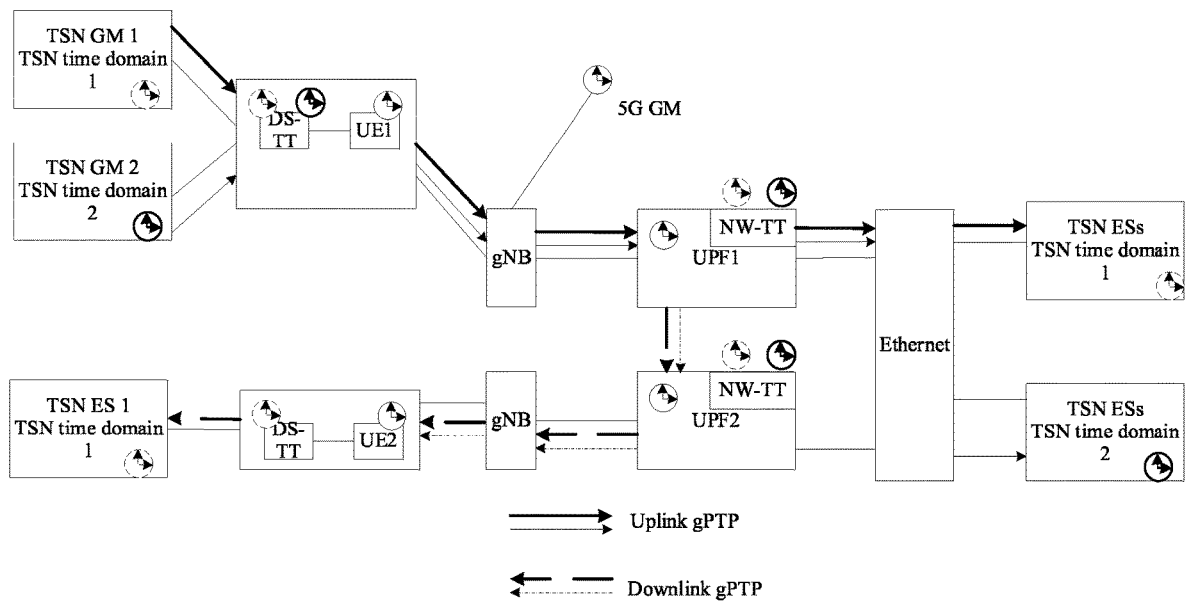
FIG. 12 is a schematic architectural diagram of time synchronization according to an embodiment of the present disclosure.

In an actual scenario, one UE may be simultaneously connected to a plurality of TSN GMs in a plurality of TSN time domains. In the embodiments of FIG. 11 and FIG. 12, an example in which UE1 is simultaneously connected to the TSN GM 1 in the TSN time domain 1 and the TSN GM 2 in the TSN time domain 2 is used for description. However, a quantity of TSN GMs in different TSN time domains to which one UE is simultaneously connected may be changed in different embodiments.

The TSN GM 1 and the TSN GM 2 in FIG. 11 and FIG. 12 may be physically one same grandmaster clock or different grandmaster clocks. These embodiments are examples and other embodiments may be modified.

As shown in FIG. 10, in the embodiments of the present disclosure, the foregoing step S530 may further include the following steps:

S531: Transmit the target Single Network Slice Selection Assistance Information, the target Data Network Name, the first identity information, the first type indication information of the first time-sensitive network grandmaster clock, the second identity information, the first type indication information of the second time-sensitive network grandmaster clock, and the first Protocol Data Unit session request information element to the first target Session Management Function.

Step S532: Store the target Single Network Slice Selection Assistance Information, the target Data Network Name, the first target label information of the first target Session Management Function, the first identity information, the first type indication information of the first time-sensitive network grandmaster clock, the second identity information, and the first type indication information of the second time-sensitive network grandmaster clock in the context of the first terminal in the Unified Data Manager by using the first target Session Management Function, so that the first time-sensitive network time domain and the second time-sensitive network time domain share the first target Session Management Function.

When one UE1 is connected to a plurality of TSN GMs, for example, the TSN GM 1 in the TSN time domain 1 and the TSN GM 2 in the TSN time domain 2, UE1 may establish one PDU Session (for example, the foregoing first PDU session) to simultaneously transfer a UL time synchronization message for a plurality of TSN GMs in a plurality of TSN time domains. Therefore, the TSN Time Domain 1 ID and the Time GM Source Indication in steps 1, 3, and 16c in Embodiment 8 turn into a List (the TSN Time Domain ID and the Time GM Source Indication), for example, a List (the TSN Time Domain 1 ID and the Time GM Source Indication (indicating the TSN GM 1) and the TSN Time Domain 2 ID and the Time GM Source Indication (indicating the TSN GM 2)). In this way, all TSN Time Domains that are simultaneously connected to one same UE use the same SMF ID.

In an example embodiment, the method may further include: transmitting a second time synchronization message of the second time-sensitive network grandmaster clock by using a first Protocol Data Unit session corresponding to the first Protocol Data Unit session identity.

Figure 13:
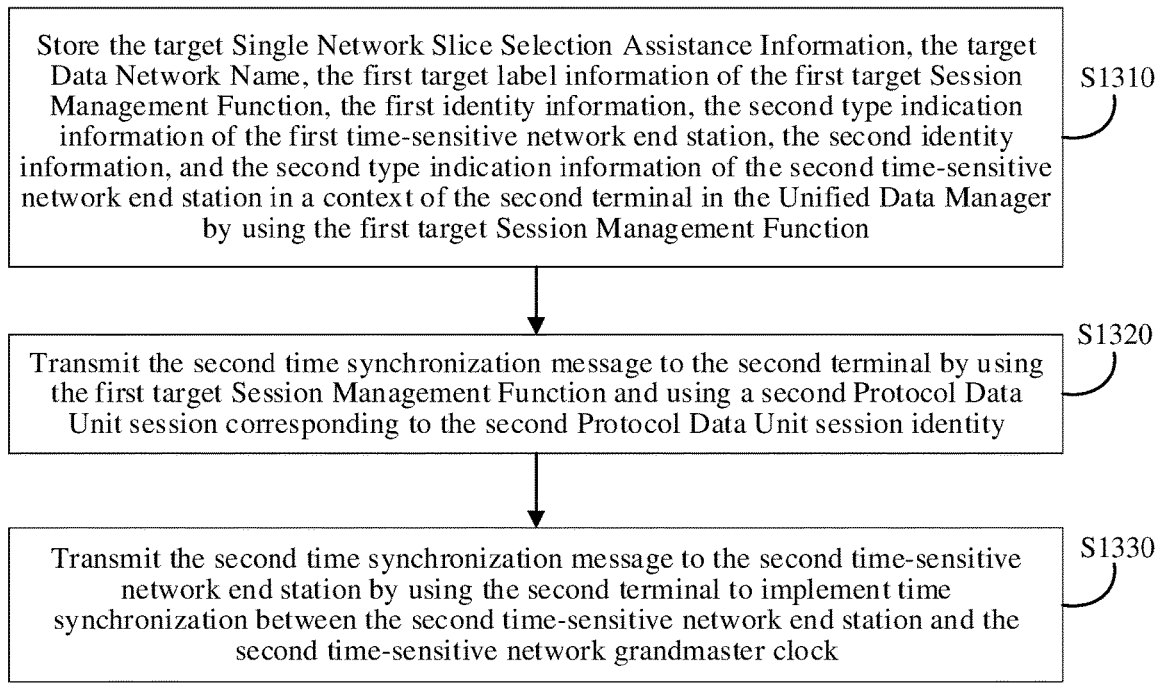
FIG. 13 is a schematic flowchart of a method for implementing time synchronization according to an embodiment of the present disclosure.

FIG. 13 is a schematic flowchart of a method for implementing time synchronization according to an embodiment of the present disclosure. In an example embodiment, the second terminal may be further connected to a second time-sensitive network end station in the second time-sensitive network time domain, and the second request further includes the second identity information of the second time-sensitive network time domain and second type indication information of the second time-sensitive network end station.

As shown in FIG. 13, a difference from the foregoing embodiments lies in that the method provided in the embodiments of the present disclosure further the following steps:

S1310: Store the target Single Network Slice Selection Assistance Information, the target Data Network Name, the first target label information of the first target Session Management Function, the first identity information, the second type indication information of the first time-sensitive network end station, the second identity information, and the second type indication information of the second time-sensitive network end station in the second terminal in the Unified Data Manager by using the first target Session Management Function.

S1320: Transmit the second time synchronization message to the second terminal by using the first target Session Management Function and using a second Protocol Data Unit session corresponding to the second Protocol Data Unit session identity.

S1330: Transmit the second time synchronization message to the second time-sensitive network end station by using the second terminal to implement time synchronization between the second time-sensitive network end station and the second time-sensitive network grandmaster clock.

Figure 14:
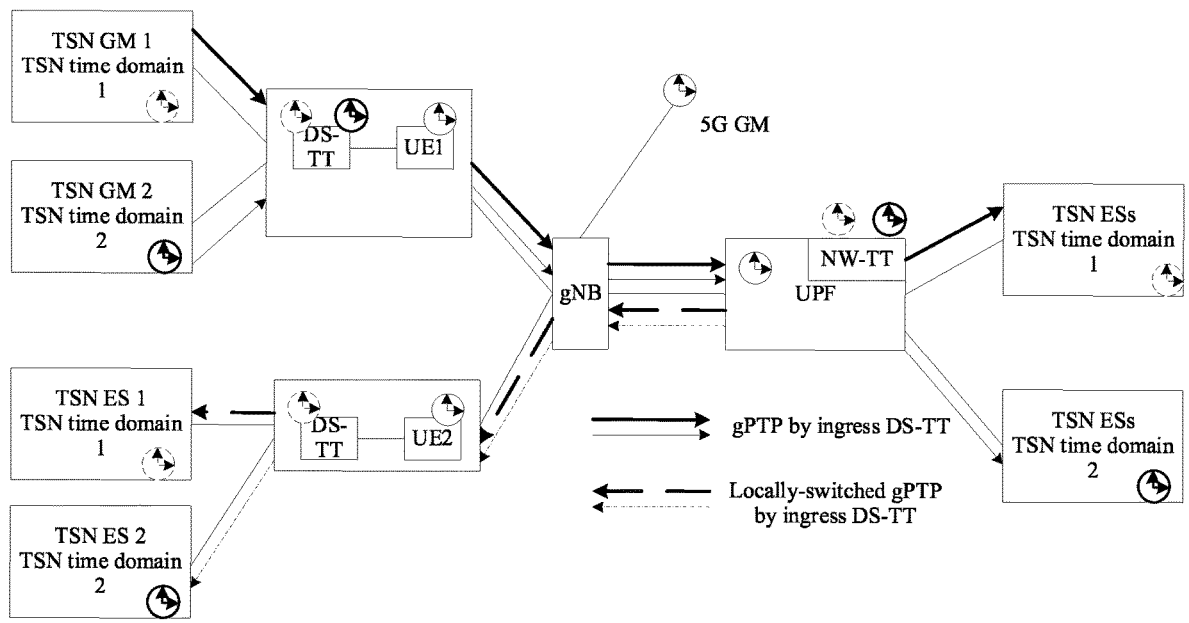
FIG. 14 is a schematic architectural diagram of time synchronization according to an embodiment of the present disclosure.
Figure 15:
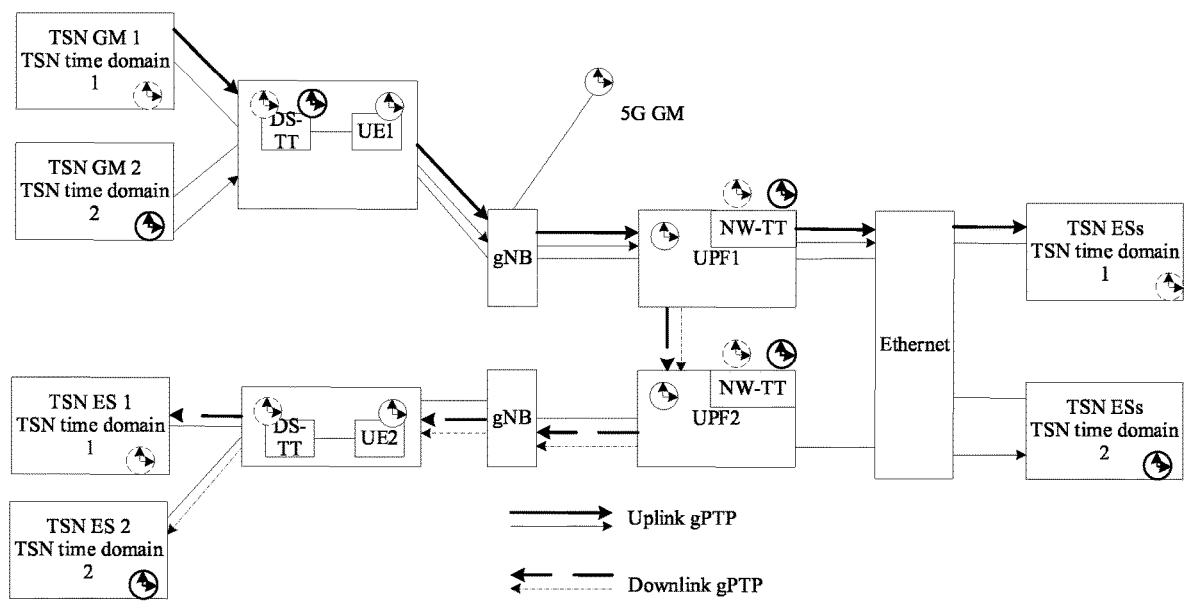
FIG. 15 is a schematic architectural diagram of time synchronization according to an embodiment of the present disclosure.

In the embodiments of the present disclosure, one UE such as UE2 may be simultaneously connected to TSN ESs in a plurality of TSN time domains. UE2 may establish one PDU Session (for example, the foregoing second PDU session) to simultaneously transfer a time synchronization message for a plurality of TSN time domains. An example in which UE2 is simultaneously connected to two ESs is used for description. For example, as shown in FIG. 14 and FIG. 15, UE2 is simultaneously connected to the TSN ES1 in the TSN time domain 1 and the TSN ES2 in the TSN time domain 2. Therefore, the TSN Time Domain 1 ID and the Time End Station Indication in steps 1, 3, and 16c in the foregoing embodiment of establishing a PDU session by UE2 turn into a List (the TSN Time Domain ID and the Time End Station Indication), for example, a List (the TSN Time Domain 1 ID and the Time End Station Indication (indicating the TSN ES 1) and (the TSN Time Domain 2 ID and the Time End Station Indication (indicating the TSN ES 2)). In this way, all TSN Time Domains that are simultaneously connected to one same UE use the same SMF ID.

In an example embodiment, the method may further include: receiving a third request sent by a third terminal (for example, UE3 shown in FIG. 16 and FIG. 17), the third terminal being connected to a third time-sensitive network grandmaster clock (for example, the TSN Time Domain 3 shown in FIG. 16 and FIG. 17) in a third time-sensitive network time domain (for example, the TSN GM 3 shown in FIG. 16 and FIG. 17), the third request comprising the target Single Network Slice Selection Assistance Information, the target Data Network Name, third identity information (the TSN Time Domain 3 ID) of the third time-sensitive network time domain, first type indication information (the Time GM Source Indication of the TSN GM 3) of the third time-sensitive network grandmaster clock, a third Protocol Data Unit session identity, and a third Protocol Data Unit session request information element; determining a second target Session Management Function of the third terminal according to the target Single Network Slice Selection Assistance Information, the target Data Network Name, the third identity information, and the first type indication information of the third time-sensitive network grandmaster clock in the third request by using the Network Repository Function; transmitting the target Single Network Slice Selection Assistance Information, the target Data Network Name, the third identity information, the first type indication information of the third time-sensitive network grandmaster clock, and the third Protocol Data Unit session request information element to the second target Session Management Function, so that the second target Session Management Function stores second target label information of the second target Session Management Function, the target Single Network Slice Selection Assistance Information, the target Data Network Name, the third identity information, and the first type indication information of the third time-sensitive network grandmaster clock in the third terminal in the Unified Data Manager.

In an example embodiment, the method may further include: receiving a fourth request sent by a fourth terminal (for example, UE4 in FIG. 16 and FIG. 17), the fourth terminal being separately connected to the first time-sensitive network end station (for example, the TSN ES 1 of the TSN Time Domain 1 in FIG. 16 and FIG. 17) in the first time-sensitive network time domain, a second time-sensitive network end station (for example, the TSN ES 2 of the TSN Time Domain 2 in FIG. 16 and FIG. 17) in the second time-sensitive network time domain, and a third time-sensitive network end station (for example, the TSN ES 3 of the TSN Time Domain 3 in FIG. 16 and FIG. 17) in the third time-sensitive network time domain, the fourth request comprising the target Single Network Slice Selection Assistance Information, the target Data Network Name, the first identity information, the second type indication information of the first time-sensitive network end station, the second identity information, second type indication information of the second time-sensitive network end station, the third identity information, second type indication information of the third time-sensitive network end station, a fourth Protocol Data Unit session identity, and a fourth Protocol Data Unit session request information element; obtaining a target label information failure indication or separately obtaining the first target label information and the second target label information from the Unified Data Manager according to the target Single Network Slice Selection Assistance Information, the target Data Network Name, the first identity information, the first type indication information of the first time-sensitive network grandmaster clock, the second identity information, the first type indication information of the second time-sensitive network grandmaster clock, the third identity information, and the first type indication information of the third time-sensitive network grandmaster clock in the fourth request; and transmitting a fourth Protocol Data Unit session setup failure message to the fourth terminal according to the target label information failure indication or according to the first target label information and the second target label information.

In an example embodiment, the method may further include: receiving a fifth request sent by the fourth terminal, the fifth request comprising the target Single Network Slice Selection Assistance Information, the target Data Network Name, the first identity information, the second type indication information of the first time-sensitive network end station, a fifth Protocol Data Unit session identity, and a fifth Protocol Data Unit session request information element; and obtaining the first target label information from the Unified Data Manager according to the target Single Network Slice Selection Assistance Information, the target Data Network Name, the first identity information, and the first type indication information of the first time-sensitive network grandmaster clock in the fifth request.

In an example embodiment, the method may further include: storing the target Single Network Slice Selection Assistance Information, the target Data Network Name, the first target label information of the first target Session Management Function, the first identity information, and the second type indication information of the first time-sensitive network end station in the fourth terminal in the Unified Data Manager by using the first target Session Management Function.

In an example embodiment, the method may further include: receiving a sixth request sent by the fourth terminal, the sixth request comprising the target Single Network Slice Selection Assistance Information, the target Data Network Name, the second identity information, the second type indication information of the second time-sensitive network end station, a sixth Protocol Data Unit session identity, and a sixth Protocol Data Unit session request information element; and obtaining the first target label information from the Unified Data Manager according to the target Single Network Slice Selection Assistance Information, the target Data Network Name, the second identity information, and the first type indication information of the second time-sensitive network grandmaster clock in the sixth request.

In an example embodiment, the method may further include: storing the target Single Network Slice Selection Assistance Information, the target Data Network Name, the first target label information of the first target Session Management Function, the second identity information, and the second type indication information of the second time-sensitive network end station in the context of the fourth terminal in the Unified Data Manager by using the first target Session Management Function.

In an example embodiment, the method may further include: receiving a seventh request sent by the fourth terminal, the seventh request comprising the target Single Network Slice Selection Assistance Information, the target Data Network Name, the third identity information, the second type indication information of the third time-sensitive network end station, a seventh Protocol Data Unit session identity, and a seventh Protocol Data Unit session request information element; and obtaining the second target label information from the Unified Data Manager according to the target Single Network Slice Selection Assistance Information, the target Data Network Name, the third identity information, and the first type indication information of the third time-sensitive network grandmaster clock in the seventh request.

In an example embodiment, the method may further include: storing the target Single Network Slice Selection Assistance Information, the target Data Network Name, the second target label information of the second target Session Management Function, the third identity information, and the second type indication information of the third time-sensitive network end station in the context of the fourth terminal in the Unified Data Manager by using the second target Session Management Function.

In the embodiments of the present disclosure, UE3 may be connected to a TSN grandmaster clock of one TSN time domain or may be connected to TSN grandmaster clocks of a plurality of different TSN time domains. In the following example description, an example in which UE3 is connected to TSN grandmaster clocks of two different TSN time domains is used for description. These embodiments are examples and other embodiments may be different.

In an example embodiment, the method may further include: receiving an eighth request sent by a third terminal (UE3), the third terminal being connected to a third time-sensitive network grandmaster clock (a TSN GM 3) in a third time-sensitive network time domain (a TSN Time Domain 3) and a fourth time-sensitive network grandmaster clock (for example, a TSN GM 4 in FIG. 16 and FIG. 17) in a third time-sensitive network time domain (for example, a TSN Time Domain 4 in FIG. 16 and FIG. 17), the eighth request comprising the target Single Network Slice Selection Assistance Information, the target Data Network Name, third identity information (a TSN Time Domain 3 ID) of the third time-sensitive network time domain, first type indication information (a Time GM Source Indication of the TSN GM 3) of the third time-sensitive network grandmaster clock, fourth identity information (a TSN Time Domain 4 ID) of the fourth time-sensitive network time domain, first type indication information (a Time GM Source Indication of the TSN GM 4) of the fourth time-sensitive network grandmaster clock, an eighth Protocol Data Unit session identity, and an eighth Protocol Data Unit session request information element; determining a second target Session Management Function of the third terminal according to the target Single Network Slice Selection Assistance Information, the target Data Network Name, the third identity information, and the first type indication information of the third time-sensitive network grandmaster clock, the fourth identity information, and the first type indication information of the fourth time-sensitive network grandmaster clock, in the eighth request by using the Network Repository Function; transmitting the target Single Network Slice Selection Assistance Information, the target Data Network Name, the third identity information, the first type indication information of the third time-sensitive network grandmaster clock, the fourth identity information, the first type indication information of the fourth time-sensitive network grandmaster clock, and the eighth Protocol Data Unit session request information element to the second target Session Management Function, so that the second target Session Management Function stores second target label information of the second target Session Management Function, the target Single Network Slice Selection Assistance Information, the target Data Network Name, the third identity information, and the first type indication information of the third time-sensitive network grandmaster clock, the fourth identity information, and the first type indication information of the fourth time-sensitive network grandmaster clock in the third terminal in the Unified Data Manager.

In an example embodiment, the method may further include: receiving a ninth request sent by a fourth terminal (for example, UE4 in FIG. 16 and FIG. 17), the fourth terminal being separately connected to the first time-sensitive network end station (for example, the TSN ES 1 of the TSN Time Domain 1 in FIG. 16 and FIG. 17) in the first time-sensitive network time domain, a second time-sensitive network end station (for example, the TSN ES 2 of the TSN Time Domain 2 in FIG. 16 and FIG. 17) in the second time-sensitive network time domain, a third time-sensitive network end station (for example, the TSN ES 3 of the TSN Time Domain 3 in FIG. 16 and FIG. 17) in the third time-sensitive network time domain, and a fourth time-sensitive network end station (for example, the TSN ES 4 of the TSN Time Domain 4 in FIG. 16 and FIG. 17) in the fourth time-sensitive network time domain, the ninth request comprising the target Single Network Slice Selection Assistance Information, the target Data Network Name, the first identity information, the second type indication information of the first time-sensitive network end station, the second identity information, second type indication information of the second time-sensitive network end station, the third identity information, second type indication information of the third time-sensitive network end station, the fourth identity information, second type indication information of the fourth time-sensitive network end station, a ninth Protocol Data Unit session identity, and a ninth Protocol Data Unit session request information element; obtaining a target label information failure indication or separately obtaining the first target label information and the second target label information from the Unified Data Manager according to the target Single Network Slice Selection Assistance Information, the target Data Network Name, the first identity information, the first type indication information of the first time-sensitive network grandmaster clock, the second identity information, the first type indication information of the second time-sensitive network grandmaster clock, the third identity information, the first type indication information of the third time-sensitive network grandmaster clock, the fourth identity information, and the first type indication information of the fourth time-sensitive network end station in the fourth request; and transmitting a fourth Protocol Data Unit session setup failure message to the ninth terminal according to the target label information failure indication or according to the first target label information and the second target label information.

In an example embodiment, the method may further include: receiving a tenth request sent by the fourth terminal, the tenth request comprising the target Single Network Slice Selection Assistance Information, the target Data Network Name, the fourth identity information, the second type indication information of the fourth time-sensitive network end station, a tenth Protocol Data Unit session identity, and a tenth Protocol Data Unit session request information element; and obtaining the second target label information from the Unified Data Manager according to the target Single Network Slice Selection Assistance Information, the target Data Network Name, the fourth identity information, and the first type indication information of the fourth time-sensitive network grandmaster clock in the tenth request.

In an example embodiment, the method may further include: storing the target Single Network Slice Selection Assistance Information, the target Data Network Name, the second target label information of the second target Session Management Function, the fourth identity information, and the second type indication information of the fourth time-sensitive network end station in the context of the fourth terminal in the Unified Data Manager by using the second target Session Management Function.

In the embodiments of the present disclosure, the same SMF may be used in some TSN Time Domains. If one UE1 is connected to a plurality of TSN GMs, for example, the TSN Time Domain 1 and the TSN Time Domain 2, UE1 establishes one PDU Session (corresponding to SMF1) to simultaneously transfer UL time synchronization messages of the plurality of TSN Time Domains. Therefore, the TSN Time Domain 1 ID and the Time GM Source Indication in steps 1, 3, and 16c in the embodiment in FIG. 8 turn into a List (the TSN Time Domain 1 ID and the Time GM Source Indication) and the TSN Time Domain 2 ID and the Time GM Source Indication).

If UE3 is connected to one or more TSN GMs of other different TSN Time Domains, for example, the TSN GM 3 of the TSN Time Domain 3 and the TSN GM 4 of the TSN Time Domain 4, UE3 establishes one PDU Session (that is, the foregoing eighth PDU session, and assuming that an SMF selected for UE3 is SMF2, if UE3 is connected to the TSN GM 3 of the TSN Time Domain 3, the PDU session corresponds to the foregoing third PDU session) to simultaneously transfer the UL time synchronization messages of the plurality of TSN Time Domains. Therefore, the TSN Time Domain 1 ID and the Time GM Source Indication in steps 1, 3, and 16c in the embodiment in FIG. 8 turn into a List (the TSN Time Domain 3 ID and the Time GM Source Indication (indicating the TSN GM 3)) and the TSN Time Domain 4 ID and the Time GM Source Indication (indicating the TSN GM 4)).

If one UE4 is connected to a plurality of TSN End Stations to synchronize the TSN Time Domains 1, 2, 3, and 4, UE4 establishes one PDU Session to simultaneously transfer time synchronization messages of the plurality of TSN Time Domains (for example, 1, 2, 3, and 4). The TSN Time Domain 1 ID and the Time GM Source Indication in steps 1, 3, and 16c in the embodiment in FIG. 8 turn into a List (the TSN Time Domain 1 ID and the Time End Station Indication (indicating that the TSN ES 1)), the TSN Time Domain 2 ID and the Time End Station Indication (indicating the TSN ES 2), the TSN Time Domain 3 ID and the Time End Station Indication (indicating the TSN ES 3), and the TSN Time Domain 4 ID and the Time End Station Indication (indicating the TSN ES 4)).

However, because the TSN Time Domains 1 and 2 share one SMF1 and the TSN Time Domains 3 and 4 share one SMF2, the PDU Session (that is, the fourth PDU session) fails to be established. The UDM returns one target label information failure indication used for indicating that an SMF ID of a current search fails or the UDM returns the SMF1 ID and the SMF ID 2. When the AMF determines that the two SMF IDs are different, a fourth Protocol Data Unit session setup failure message is transmitted to UE4. After receiving a failure message, UE4 may sequentially establish a plurality of PDU Sessions according to various TSN Time Domains (for example, four PDU Sessions are established for four ESs, including the foregoing fifth PDU session established for UE4 connected to the TSN ES 1 of the TSN Time Domain 1 and the sixth PDU session established for UE4 connected to the TSN ES 2 of the TSN Time Domain 2).

Figure 16:
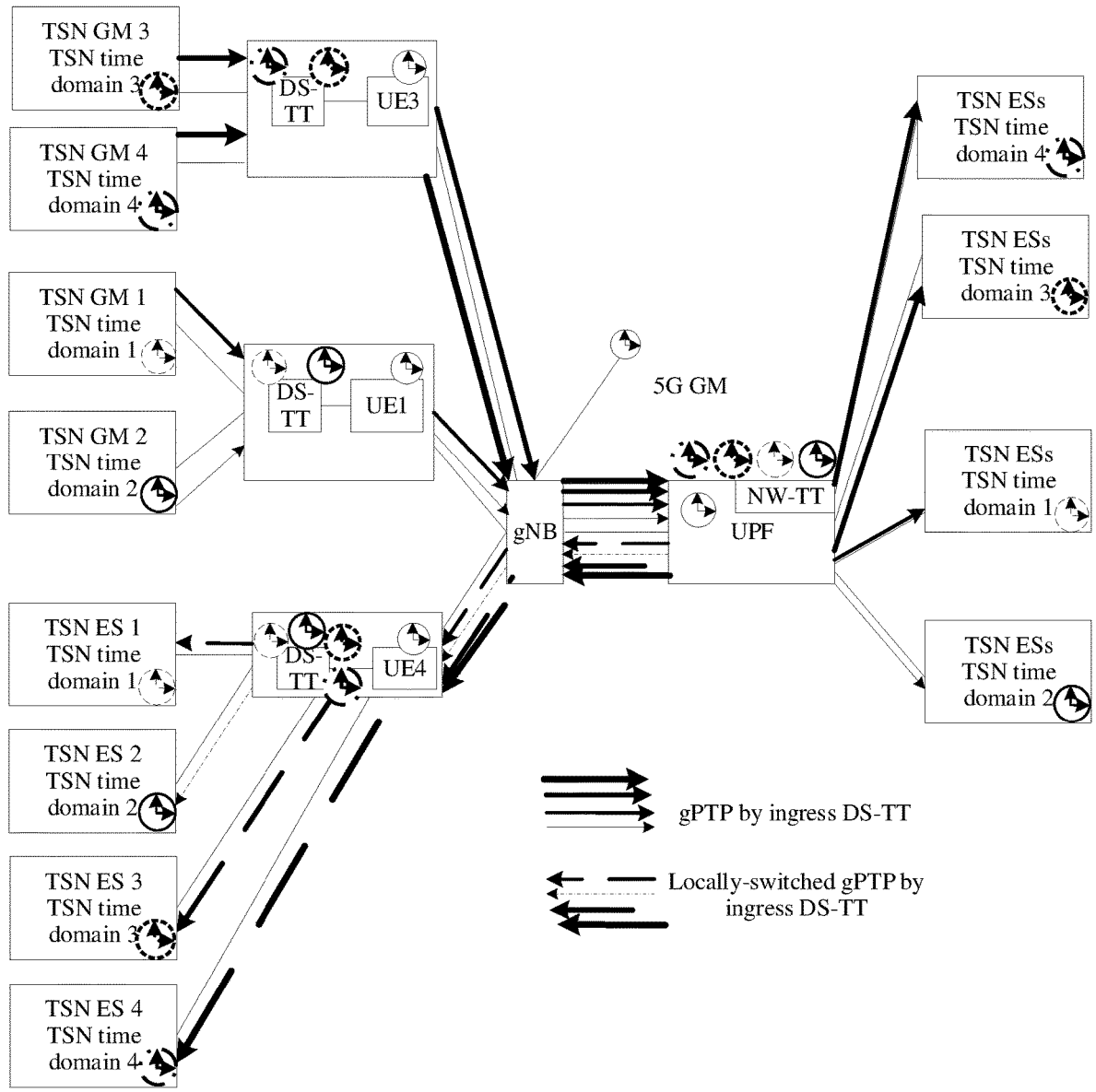
FIG. 16 is a schematic architectural diagram of time synchronization according to an embodiment of the present disclosure.
Figure 17:
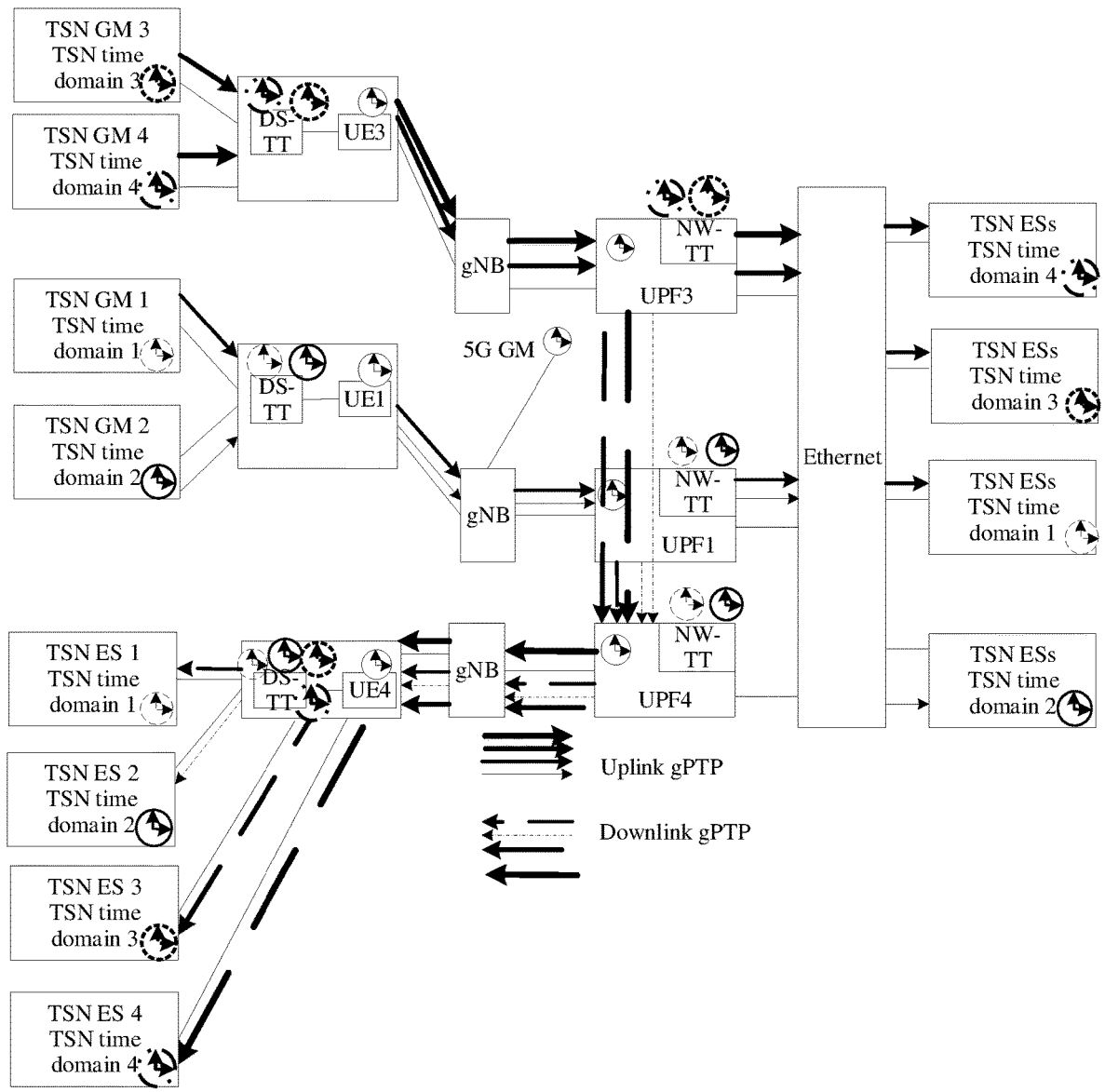
FIG. 17 is a schematic architectural diagram of time synchronization according to an embodiment of the present disclosure.

In the embodiment of FIG. 16, UE1, UE3, and UE4 share one same UPF. That is, base stations that respectively correspond to UE1, UE3, and UE4 can be connected to the one same UPF. In the embodiment of FIG. 17, UE1, UE3, and UE4 respectively have respective UPF1, UPF3, and UPF4. In the foregoing similar manner, time synchronization between one or more TSN ESs of the TSN time domain 3 on the side of the UPF/NW-TT and the TSN GM 3 of the TSN time domain 3 on the side of UE3 and time synchronization between one or more TSN ESs of the TSN time domain 4 on the side of the UPF/NW-TT and the TSN GM 4 of the TSN time domain 4 on the side of UE3 may be implemented, or time synchronization between the TSN ES 3 of the TSN time domain 3 on the side of UE4 and the TSN GM 3 of the TSN time domain 3 on the side of UE3 and time synchronization between the TSN ES 3 of the TSN time domain 4 on the side of UE4 and the TSN GM 3 of the TSN time domain 4 on the side of UE3 may be implemented, or time synchronization between the TSN ES 1 of the TSN time domain 1 on the side of UE4 and the TSN GM 1 of the TSN time domain 1 on the side of UE1 and time synchronization between the TSN ES 2 of the TSN time domain 2 on the side of UE4 and the TSN GM 2 of the TSN time domain 2 on the side of UE1 may be implemented.

Apart from FIG. 16 and FIG. 17 in the foregoing examples, there may be other examples. For example, UE1 and UE4 share one same UPF, and UE3 uses another different UPF. In another example, UE1 and UE3 share one same UPF, and UE4 uses another different UPF. Alternatively, UE3 and UE4 share one same UPF, and UE1 uses another different UPF.

In an example embodiment, the method may further include: receiving a first modification request sent by the fourth terminal, the first modification request comprising the fifth Protocol Data Unit session identity, the first identity information, the second type indication information of the first time-sensitive network end station, the second identity information, the second type indication information of the second time-sensitive network end station, and the fifth Protocol Data Unit session request information element; and transmitting the fifth Protocol Data Unit session identity, the first identity information, the second type indication information of the first time-sensitive network end station, the second identity information, the second type indication information of the second time-sensitive network end station, and the fifth Protocol Data Unit session request information element to the first target Session Management Function, so that the first target Session Management Function stores the first target label information, the fifth Protocol Data Unit session identity, the first identity information, the second type indication information of the first time-sensitive network end station, the second identity information, the second type indication information of the second time-sensitive network end station, the target Single Network Slice Selection Assistance Information, and the target Data Network Name in the context of the fourth terminal in the Unified Data Manager.

In an example embodiment, the method may further include: receiving a second modification request sent by the fourth terminal, the second modification request comprising the sixth Protocol Data Unit session identity and the sixth Protocol Data Unit session request information element and not carrying the second identity information and the second type indication information of the second time-sensitive network end station.

In the foregoing embodiments, when UE4 finds that the SMF ID of the PDU Session of the TSN Time Domain 2 and the SMF ID of the PDU Session of the TSN Time Domain 1 are the same SMF ID (SMF1), UE4 may initiate release the PDU Session of the TSN Time Domain 2. In addition, the PDU Session of the TSN Time Domain 1 is modified to support simultaneous transmission of the time synchronization message of the TSN Time Domain 2. Alternatively, UE4 may initiate release the PDU Session of the TSN Time Domain 1. In addition, the PDU Session of the TSN Time Domain 2 is modified to support simultaneous transmission of the time synchronization message of the TSN Time Domain 1.

Similarly, when UE4 finds that the SMF ID of the PDU Session of the TSN Time Domain 4 and the SMF ID of the PDU Session of the TSN Time Domain 3 are the same SMF ID (SMF2), UE4 may initiate release the PDU Session of the TSN Time Domain 4. In addition, the PDU Session of the TSN Time Domain 3 is modified to support simultaneous transmission of the time synchronization message of the TSN Time Domain 4. Alternatively, UE4 may initiate release the PDU Session of the TSN Time Domain 3. In addition, the PDU Session of the TSN Time Domain 4 is modified to support simultaneous transmission of the time synchronization message of the TSN Time Domain 3.

Figure 18:
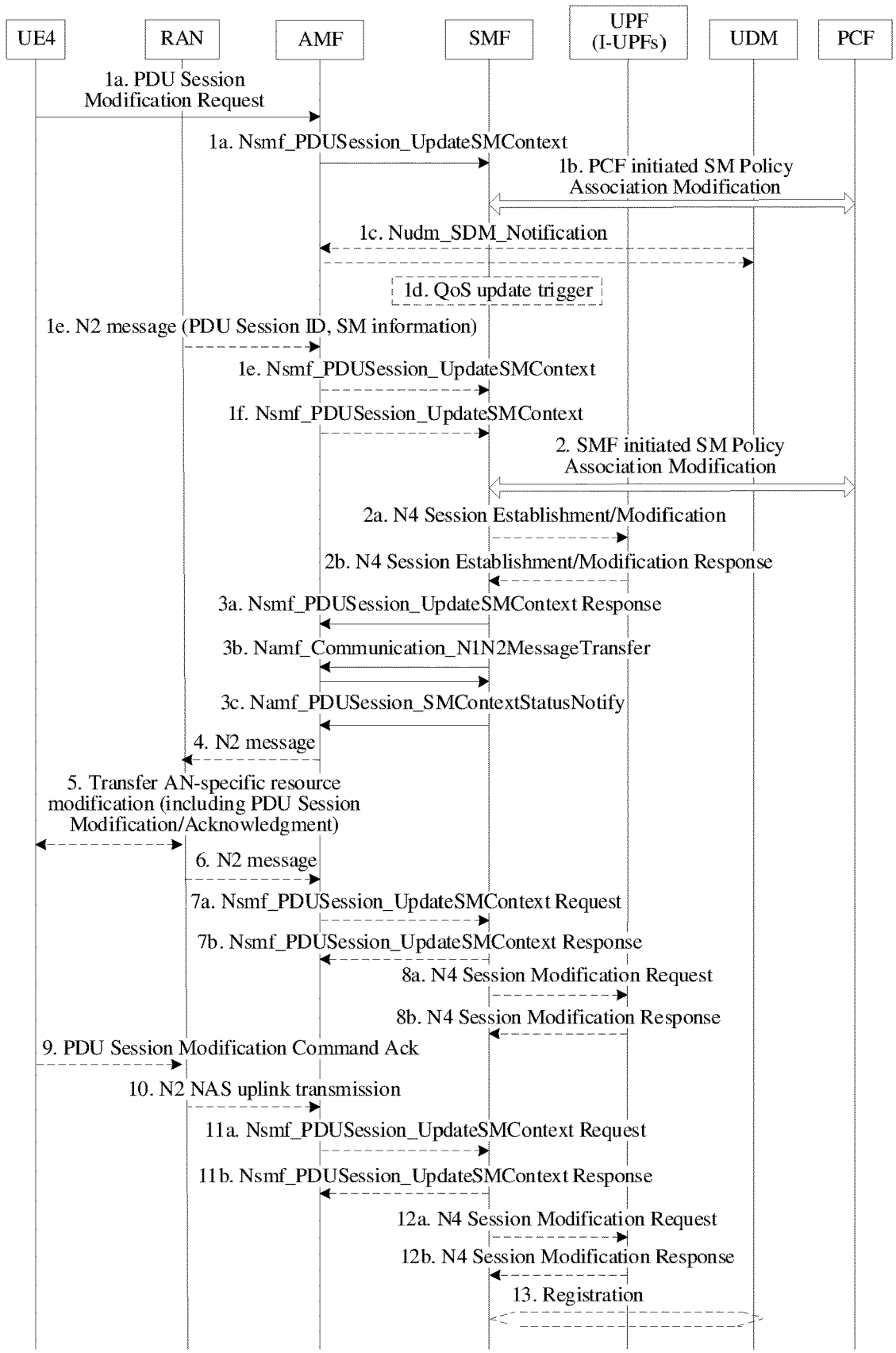
FIG. 18 is a schematic overall flowchart of a PDU session combination procedure initiated by UE4 according to an embodiment of the present disclosure.

FIG. 18 is a schematic overall flowchart of a PDU session combination procedure initiated by UE4 according to an embodiment of the present disclosure.

When one or more QoS parameters between UE and a network are modified, a PDU Session Modification procedure is used. The UE or the network requests PDU Session Modification (non-roaming and roaming with local breakout). A process that the UE or the network requests PDU Session Modification (a non-roaming and roaming with local breakout scenario) is described in FIG. 8.

Step 1: This process may be triggered by the following event:

Step 1a: (The UE initiates modification) The UE transmits a NAS message to initiate a PDU Session Modification procedure. The NAS message carries the following messages: an N1 SM container (a PDU Session Modification Request (a PDU session ID, Packet Filters, an Operation, a List {a TSN Time Domain ID, a Time End Station Indication}, Requested QoS, Segregation, a 5GSM Core Network Capability, a Number Of Packet Filters, [Always-on PDU Session Requested]), a PDU Session ID, a UE Integrity Protection Maximum Data Rate, [Port Management Information Container]. The PDU Session Modification Request refers to the PDU Session Modification Request. Packet Filters refer to Packet Filters. The Operation refers to an operation. Requested QoS refers to requested QoS. Segregation refers to Segregation. The 5GSM Core Network Capability refers to a 5GSM Core Network Capability. Number Of Packet Filters refers to the number of packet filters. Always-on PDU Session Requested refers to Always-on PDU Session Requested. The UE Integrity Protection Maximum Data Rate refers to the Integrity Protection Maximum Data Rate. The NAS message is forward by the (R)AN to the AMF, and indicates User location Information. The AMF proposes Nsmf_PDUSession_UpdateSMContext (the SM Context ID, and the N1 SM container (PDU Session Modification Request)).

If a quantity of TSN Time Domain Ids in the List {a TSN Time Domain ID and a Time End Station Indication} in step 1a is increased compared with that before modification, PDU Sessions of a plurality of TSN Time Domains are combined into one PDU Session. That is, the modification of a PDU Session is the addition of the transmission of UL time synchronization messages of GMs of one or more TSN Time Domains. Step 16c (that is, step 13 in FIG. 18) in the embodiment of FIG. 8 is added after step 12b: The SMF registers its SMF ID and the PDU Session ID in the UDM, and adds two new parameters: Nudm_UECM_Registration (a SUPI, a DNN, S-NSSAI, a PDU Session ID, an SMF Identity, and a List {a TSN Time Domain ID and a Time End Station Indication}). In this case, the List {a TSN Time Domain ID and a Time End Station Indication} is the modified List.

If a quantity of TSN Time Domain Ids in the foregoing List {a TSN Time Domain ID and a Time End Station Indication} is decreased compared with that before modification, PDU Sessions of one or more TSN Time Domains are deleted from the PDU Session.

When the UE requests specific QoS processing for a selected SDF(s), the PDU Session Modification Request includes described SDF(s) and Packet Filters, a Packet Filter operation (addition, modification, or deletion) requested for the indicated Packet Filters, requested QoS, and an optional Segregation indication in some embodiments. When the UE recommends that the network binds an applicable SDF(s) to different dedicated QoS flows (for example, even if an existing QoS flow can support requested QoS), a Segregation instruction is included. It is required that the network comply with the request of the UE. However, during running, the selected SDF(s) continues to be bound on the existing QoS flow.

For a PDU session established in an EPS, when the UE moves from an EPS to a 5GS for the first time, if the UE wants to change the PDU session to an always-on PDU Session, the UE adds one Always-on PDU Session Requested instruction to a PDU session modification request message.

Step 1b: (The SMF requests modification) The PCF performs a PCF initiated SM Policy Association Modification procedure to notify modification of the SMF policy.

Step 1c: (The SMF requests modification) The UDM updates subscription data of the SMF by using Nudm_SDM_Notification. The SMF updates session management subscription data, and transmits an Ack to the UDM to indicate acknowledgment.

Step 1d: (The SMF requests modification) The SMF may determine to modify the PDU Session. This procedure may be triggered by a locally configured policy or triggered from a (R)AN. If an UP connection is activated and the SMF has labeled that the status of one or more QoS flows is deleted in the 5GS but is not synchronized with the UE, the event may also be triggered.

If the SMF receives one of the triggers in step 1b to step 1d, the SMF initiates the PDU session modification procedure requested by the SMF.

Step 1e: (The AN initiates modification) When an AN resource to which a QoS flow is mapped is released, regardless of whether notification control is configured, the (R)AN is to instruct the SMF. The (R)AN transmits an N2 message (a PDU Session ID and N2 SM information) to the AMF. The AMF transmits Nsmf_PDUSession_UpdateSMContext to the SMF.

Step 1f: (The AMF initiates modification) If the UE supports a CE mode B and the use of a CE mode in Enhanced Coverage Restriction information in a UE context of the AMF is changed from restricted to unrestricted or otherwise the UE has established a PDU session, the AMF is to trigger PDU session modification of SMFs of a PDU session serving the UE.

Step 2: The SMF may need to perform an SMF initiated SM Policy Association Modification procedure to report a series of subscribed events to the PCF. If step 1*b* or step 1*d* triggers the PDU session modification procedure, this step may be skipped.

When the PDU session modification only requires an operation (for example, gating) at the UPF, step 2*a* to step 7 are not activated.

Step 2*a*: If redundancy transmission of the PDU session is not activated, the SMF determines to perform redundancy transmission for a QoS flow, and the SMF has allocated CN Tunnel Info (CN tunnel information), the SMF allocates additional CN Tunnel Info. Additional CN Tunnel Info is provided to the UPF by using an N4 Session Modification Request.

If the redundancy transmission of the PDU session is not activated, the SMF determines to perform redundancy transmission for a QoS flow with two I-UPFs between a PSA UPF and an NG-RAN, and the SMF has allocated CN Tunnel Info. CN Tunnel Info of two I-UPFs is provided to the I-UPF through an N4 Session Establishment Request message including UL-CN Tunnel Info of the PSA UPF. An N4 Session Modification Request message including DL-CN tunnel information of the two I-UPFs is transmitted to the PSA UPF.

Step 2*b*: The UPF transmits an N4 Session Establishment/Modification Response to the SMF.

Step 3*a*: For modification initiated by the UE or AN, the SMF responds to the AMF through a Nsmf_PDUSession_UpdateSMContext Response.

Step 3*b*: For modification requested by the SMF, the SMF activates Namf_Communication_N1N2MessageTransfer.

Step 3*c*: For SMF modification requested because SMF-related parameters from the UDM are updated, the SMF may provide SMF-derived CN to the AMF to assist in RAN parameter tuning. The SMF transmits Nsmf_PDUSession_SMContextStatusNotify to the AMF.

Step 4: The AMF may transmit an N2 message to the (R)AN.

Step 5: The (R)AN and the UE may transmit AN specific signaling exchange related to information received from the SMF.

Step 6: The (R)AN may transmit an N2 PDU session Ack message to the AMF to acknowledge an N2 PDU session request.

Step 7: The AMF performs an Nsmf_PDUSession_UpdateSMContext service operation to forward N2 SM information and user location information received from the AN to the SMF. The SMF returns an Nsmf_PDUSession_UpdateSMContext Response to the AMF.

If the PDU session modification is triggered by the UE and the N2 SM information indicates that modification fails, the SMF is to add an N1 SM container with a PDU session modification reject message to the Nsmf_PDUSession_UpdateSMContext Response in step 7*b* to reject the PDU session modification. In this case, step 8 is skipped.

Step 8: The SMF may transmit an N4 Session Modification Request message to the UPF to update an N4 session of the UPF related to the PDU session modification.

If the N4 Session Modification Request includes a Port Management Information Container, the UPF also adds a Port Management Container to the N4 Session Modification Response.

Step 9: The UE transmits a NAS message to acknowledge a PDU Session Modification Command.

Step 10: The R(AN) transmits the NAS message to the AMF.

Step 11: The AMF performs an Nsmf_PDUSession_UpdateSMContext service operation to transmit an N1 SM container (a PDU Session Modification Command Ack) and user location information received from the AN to the SMF. The SMF returns one Nsmf_PDUSession_UpdateSMContext Response.

Step 12: The SMF may transmit an N4 Session Modification Request message to the UPF to update an N4 session of the UPF related to the PDU session modification.

Step 13: The SMF updates UDM registration and uses Nudm_UECM_Registration (a SUPI, a DNN, S-NSSAI, a PDU Session ID, a List {a TSN Time Domain ID and a Time End Station Indication}, and an SMF ID). Therefore, the UDM updates storage of the following information: the SUPI, the SMF identity and the related DNN, the S-NSSAI, the PDU Session ID, and the List {a TSN Time Domain ID and a Time End Station Indication}.

If a quantity of TSN Time Domain Ids in the List {a TSN Time Domain ID and a Time End Station Indication} in step 13 is increased compared with that before modification, PDU Sessions of a plurality of TSN Time Domains are combined into one PDU Session. That is, the modification of a PDU Session is the addition of one or more TSN Time Domains to the UDM.

If a quantity of TSN Time Domain Ids in the foregoing List {a TSN Time Domain ID and a Time End Station Indication} is decreased compared with that before modification, one or more TSN Time Domains are deleted from the UDM.

Step 14 (not shown in the figure) may be further included. If the SMF and the PCF interact in step 1*b* or step 2, the SMF notifies whether the PCF may perform the SMF initiated SM Policy Association Modification procedure to perform PCC decision. If the SMF receives the Port Management Information Container from the UE or the UPF, the SMF provides the Port Management Information Container and a port number of a related port to the PCF in this step.

In some embodiments, only a GM and an End Station in the same TSN Time Domain can perform TSN communication, and different SN Time Domains are independent of each other. This is one example embodiment. In another embodiment, different TSN Time Domains may not be independent of each other.

In the foregoing example description, a DS-TT of UE1 is simultaneously connected to TSN GMs of the TSN Time Domain 1 and the TSN Time Domain 2. This is one example embodiment and other embodiments may be different. For example, the DS-TT of UE1 may be connected to the TSN GM of the TSN Time Domain 1, and the DS-TT of the other UE is connected to the TSN GM of the TSN Time Domain 2. However, in the foregoing example description, the DS-TT of UE2 is connected to an End Station of the TSN Time Domain 1. However, the DS-TT of UE2 may be connected to a plurality of End Stations. Each End Station separately corresponds to a different TSN Time Domain. In an actual application scenario, a DS-TT of one UE may be connected to a GM or an End station in one or more different TSN Time Domains. The DS-TT of one UE may be connected to a GM of one TSN Time Domain and simultaneously connected to an End Station of another TSN Time Domain. There may be various other combinations.

In the method for implementing time synchronization provided in the embodiments, a method for implementing TSN time synchronization between UEs in the R17 standard is provided. In another embodiment, a PDU Session management method when one UE is connected to TSN GMs of a plurality of TSN Time Domains is provided. In addition, a PDU Session management method when one UE is connected to TSN End Stations of a plurality of TSN Time Domains is further provided. In addition, a method for storing and selecting an SMF ID is further provided. TSC communication may be applied to the real-time industrial production field and has significant market value.

Figure 19:
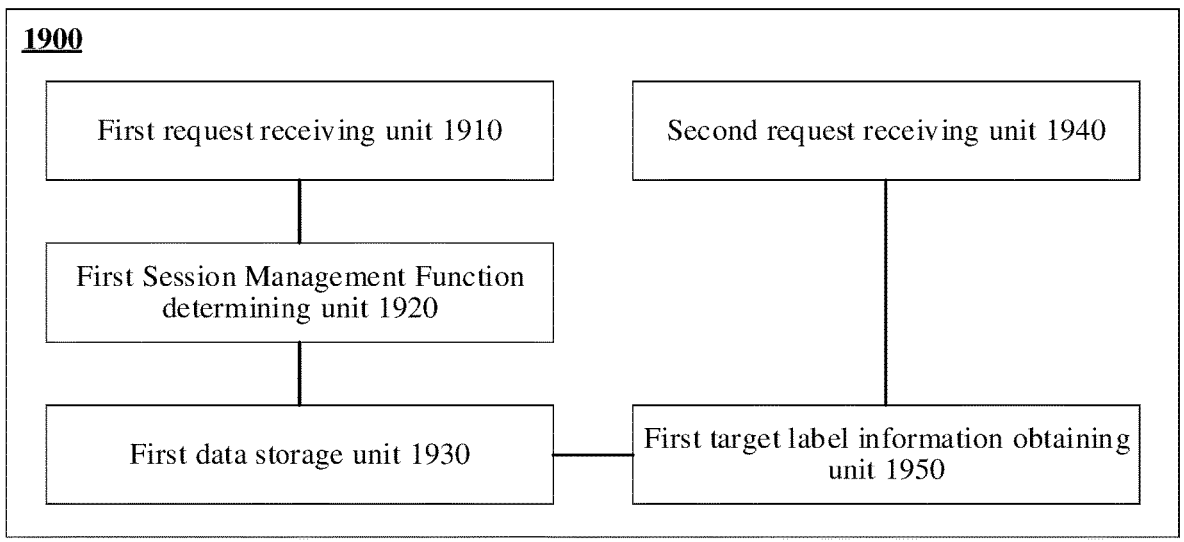
FIG. 19 is a schematic block diagram of an apparatus for implementing time synchronization according to an embodiment of the present disclosure.

FIG. 19 is a schematic block diagram of an apparatus for implementing time synchronization according to an embodiment of the present disclosure. As shown in FIG. 19, the apparatus for implementing time synchronization 1900 provided in the embodiments of the present disclosure may include a first request receiving unit 1910, a first Session Management Function determining unit 1920, a first data storage unit 1930, a second request receiving unit 1940, and a first target label information obtaining unit 1950.

The first request receiving unit 1910 may be configured to receive a first request transmitted by a first terminal, the first terminal being connected to a first time-sensitive network grandmaster clock in a first time-sensitive network time domain, the first request comprising target Single Network Slice Selection Assistance Information, a target Data Network Name, first identity information of the first time-sensitive network time domain, first type indication information of the first time-sensitive network grandmaster clock, a first Protocol Data Unit session identity, and a first Protocol Data Unit session request information element.

The first Session Management Function determining unit 1920 may be configured to determine a first target Session Management Function of the first terminal according to the target Single Network Slice Selection Assistance Information, the target Data Network Name, the first identity information, the first type indication information of the first time-sensitive network grandmaster clock in the first request by using a Network Repository Function.

The first data storage unit 1930 may be configured to transmit the target Single Network Slice Selection Assistance Information, the target Data Network Name, the first identity information, the first type indication information of the first time-sensitive network grandmaster clock and the first Protocol Data Unit session request information element to the first target Session Management Function, so that the first target Session Management Function stores first target label information of the first target Session Management Function, the target Single Network Slice Selection Assistance Information, the target Data Network Name, the first identity information, and the first type indication information of the first time-sensitive network grandmaster clock in the first terminal in a Unified Data Manager.

The second request receiving unit 1940 may be configured to receive a second request transmitted by a second terminal, the second terminal being connected to a first time-sensitive network end station in the first time-sensitive network time domain, the second request comprising the target Single Network Slice Selection Assistance Information, the target Data Network Name, the first identity information, second type indication information of the first time-sensitive network end station, a second Protocol Data Unit session identity, and a second Protocol Data Unit session request information element.

The first target label information obtaining unit 1950 may be configured to obtain the first target label information from the Unified Data Manager according to the target Single Network Slice Selection Assistance Information, the target Data Network Name, the first identity information, and the first type indication information of the first time-sensitive network grandmaster clock in the second request.

In an example embodiment, the apparatus 1900 for implementing time synchronization may further include: a second terminal data storage transfer unit, which may be configured to store the target Single Network Slice Selection Assistance Information, the target Data Network Name, the first target label information of the first target Session Management Function, the first identity information, and the second type indication information of the first time-sensitive network end station in the second terminal in the Unified Data Manager by using the first target Session Management Function.

In an example embodiment, the first Session Management Function determining unit 1920 may include: a Network Repository Function determining unit, which may be configured to determine, according to the first type indication information of the first time-sensitive network grandmaster clock, to use the Network Repository Function to select the first target Session Management Function of the first terminal; a selection information transmission unit, which may be configured to provide the target Single Network Slice Selection Assistance Information, the target Data Network Name, and the first identity information to the Network Repository Function; and a first target label information receiving unit, which may be configured to receive the first target label information of the first target Session Management Function determined by the Network Repository Function according to the target Single Network Slice Selection Assistance Information, the target Data Network Name, and the first identity information.

In an example embodiment, the first data storage unit 1930 may include: a first session request data transmission unit, which may be configured to transmit the target Single Network Slice Selection Assistance Information, the target Data Network Name, the first identity information, the first type indication information of the first time-sensitive network grandmaster clock and the first Protocol Data Unit session request information element to the first target Session Management Function; and a registration request transmission unit, which may be configured to transmit, by the first target Session Management Function, a registration request to the Unified Data Manager, the registration request including the target Single Network Slice Selection Assistance Information, the target Data Network Name, the first target label information, the first identity information, and the first type indication information of the first time-sensitive network grandmaster clock.

In an example embodiment, the first target label information obtaining unit 1950 may include: a Unified Data Manager determining unit, which may be configured to determine, according to the second type indication information of the first time-sensitive network end station, to use the Unified Data Manager to query a first target Session Management Function of the second terminal; a parameter configuration obtaining request transmission unit, which may be configured to transmit a parameter configuration obtaining request to the Unified Data Manager, the parameter configuration obtaining request including the target Single Network Slice Selection Assistance Information, the target Data Network Name, the first identity information, and the first type indication information of the first time-sensitive network grandmaster clock; and a parameter configuration obtaining response receiving unit, which may be configured to receive a parameter configuration obtaining response returned by the Unified Data Manager according to the target Single Network Slice Selection Assistance Information, the target Data Network Name, the first identity information, and the first type indication information of the first time-sensitive network grandmaster clock, the parameter configuration obtaining response including the first target label information.

In an example embodiment, the apparatus 1900 for implementing time synchronization may further include: a second session request data transmission unit, which may be configured to transmit the target Single Network Slice Selection Assistance Information, the target Data Network Name, the first identity information, and the second Protocol Data Unit session request information element to the first target Session Management Function; a first User Plane Function obtaining unit, which may be configured to obtain, by the first target Session Management Function, a first User Plane Function of the first terminal according to the target Single Network Slice Selection Assistance Information, the target Data Network Name, and the first identity information; and a second terminal User Plane Function determining unit, which may be configured to: when the first User Plane Function is connected to a base station corresponding to the second terminal, use, by the second terminal, the first User Plane Function.

In an example embodiment, the apparatus 1900 for implementing time synchronization may further include: a second User Plane Function determining unit, which may be configured to: when the first User Plane Function is not connected to the base station corresponding to the second terminal, determine a second User Plane Function for the second terminal, the second User Plane Function being connected to the base station corresponding to the second terminal.

In an example embodiment, the apparatus 1900 for implementing time synchronization may further include: a first time synchronism message transmission unit, which may be configured to transmit a first time synchronization message of the first time-sensitive network grandmaster clock by using a first Protocol Data Unit session corresponding to the first Protocol Data Unit session identity; a first time synchronism message forwarding unit, which may be configured to transmit the first time synchronization message to the second terminal by using the first target Session Management Function and using a second Protocol Data Unit session corresponding to the second Protocol Data Unit session identity; and a first time-sensitive network synchronization unit, which may be configured to transmit the first time synchronization message to the first time-sensitive network end station by using the second terminal to implement time synchronization between the first time-sensitive network end station and the first time-sensitive network grandmaster clock.

In an example embodiment, the first terminal may be further connected to a second time-sensitive network grandmaster clock in a second time-sensitive network time domain, and the first request further may include second identity information of the second time-sensitive network time domain and first type indication information of the second time-sensitive network grandmaster clock. The first data storage unit 1930 may include: a first target Session Management Function transmission unit, which may be configured to transmit the target Single Network Slice Selection Assistance Information, the target Data Network Name, the first identity information, the first type indication information of the first time-sensitive network grandmaster clock, the second identity information, the first type indication information of the second time-sensitive network grandmaster clock, and the first Protocol Data Unit session request information element to the first target Session Management Function; and a Unified Data Manager transmission unit, which may be configured to store the target Single Network Slice Selection Assistance Information, the target Data Network Name, the first target label information of the first target Session Management Function, the first identity information, the first type indication information of the first time-sensitive network grandmaster clock, the second identity information, and the first type indication information of the second time-sensitive network grandmaster clock in the context of the first terminal in the Unified Data Manager by using the first target Session Management Function, so that the first time-sensitive network time domain and the second time-sensitive network time domain share the first target Session Management Function.

In an example embodiment, the apparatus 1900 for implementing time synchronization may further include: a second time synchronism message transmission unit, which may be configured to transmit a second time synchronization message of the second time-sensitive network grandmaster clock by using a first Protocol Data Unit session corresponding to the first Protocol Data Unit session identity.

In an example embodiment, the second terminal may be further connected to a second time-sensitive network end station in the second time-sensitive network time domain, and the second request may further include the second identity information of the second time-sensitive network time domain and second type indication information of the second time-sensitive network end station. The apparatus 1900 for implementing time synchronization may further include: a second terminal Unified Data Manager storage unit, which may be configured to store the target Single Network Slice Selection Assistance Information, the target Data Network Name, the first target label information of the first target Session Management Function, the first identity information, the second type indication information of the first time-sensitive network end station, the second identity information, and the second type indication information of the second time-sensitive network end station in the second terminal in the Unified Data Manager by using the first target Session Management Function.

In an example embodiment, the apparatus 1900 for implementing time synchronization may further include: a second time synchronism message forwarding unit, which may be configured to transmit the second time synchronization message to the second terminal by using the first target Session Management Function and using a second Protocol Data Unit session corresponding to the second Protocol Data Unit session identity; and a second time-sensitive network synchronization unit, which may be configured to transmit the second time synchronization message to the second time-sensitive network end station by using the second terminal to implement time synchronization between the second time-sensitive network end station and the second time-sensitive network grandmaster clock.

In an example embodiment, the apparatus 1900 for implementing time synchronization may further include: a third request receiving unit, which may be configured to receive a third request sent by a third terminal, the third terminal being connected to a third time-sensitive network grandmaster clock in a third time-sensitive network time domain, the third request comprising the target Single Network Slice Selection Assistance Information, the target Data Network Name, third identity information of the third time-sensitive network time domain, first type indication information of the third time-sensitive network grandmaster clock, a third Protocol Data Unit session identity, and a third Protocol Data Unit session request information element; a second target Session Management Function determining unit, which may be configured to determine a second target Session Management Function of the third terminal according to the target Single Network Slice Selection Assistance Information, the target Data Network Name, the third identity information, and the first type indication information of the third time-sensitive network grandmaster clock in the third request by using the Network Repository Function; a third terminal Unified Data Manager storage unit, which may be configured to transmit the target Single Network Slice Selection Assistance Information, the target Data Network Name, the third identity information, the first type indication information of the third time-sensitive network grandmaster clock, and the third Protocol Data Unit session request information element to the second target Session Management Function, so that the second target Session Management Function stores second target label information of the second target Session Management Function, the target Single Network Slice Selection Assistance Information, the target Data Network Name, the third identity information, and the first type indication information of the third time-sensitive network grandmaster clock in the third terminal in the Unified Data Manager.

In an example embodiment, the apparatus 1900 for implementing time synchronization may further include: a fourth request receiving unit, which may be configured to receive a fourth request sent by a fourth terminal, the fourth terminal being separately connected to the first time-sensitive network end station in the first time-sensitive network time domain, a second time-sensitive network end station in the second time-sensitive network time domain, and a third time-sensitive network end station in the third time-sensitive network time domain, the fourth request comprising the target Single Network Slice Selection Assistance Information, the target Data Network Name, the first identity information, the second type indication information of the first time-sensitive network end station, the second identity information, second type indication information of the second time-sensitive network end station, the third identity information, second type indication information of the third time-sensitive network end station, a fourth Protocol Data Unit session identity, and a fourth Protocol Data Unit session request information element; a Unified Data Manager query information receiving unit, which may be configured to obtain a target label information failure indication or separately obtaining the first target label information and the second target label information from the Unified Data Manager according to the target Single Network Slice Selection Assistance Information, the target Data Network Name, the first identity information, the first type indication information of the first time-sensitive network grandmaster clock, the second identity information, the first type indication information of the second time-sensitive network grandmaster clock, the third identity information, and the first type indication information of the third time-sensitive network grandmaster clock in the fourth request; and a failure message transmission unit, which may be configured to transmit a fourth Protocol Data Unit session setup failure message to the fourth terminal according to the target label information failure indication or according to the first target label information and the second target label information.

In an example embodiment, the apparatus 1900 for implementing time synchronization may further include: a fifth request receiving unit, which may be configured to receive a fifth request sent by the fourth terminal, the fifth request comprising the target Single Network Slice Selection Assistance Information, the target Data Network Name, the first identity information, the second type indication information of the first time-sensitive network end station, a fifth Protocol Data Unit session identity, and a fifth Protocol Data Unit session request information element; and a first target label information reading unit, which may be configured to obtain the first target label information from the Unified Data Manager according to the target Single Network Slice Selection Assistance Information, the target Data Network Name, the first identity information, and the first type indication information of the first time-sensitive network grandmaster clock in the fifth request.

In an example embodiment, the apparatus 1900 for implementing time synchronization may further include: a fourth terminal Unified Data Manager storage unit, which may be configured to store the target Single Network Slice Selection Assistance Information, the target Data Network Name, the first target label information of the first target Session Management Function, the first identity information, and the second type indication information of the first time-sensitive network end station in the fourth terminal in the Unified Data Manager by using the first target Session Management Function.

In an example embodiment, the apparatus 1900 for implementing time synchronization may further include: a sixth request receiving unit, which may be configured to receive a sixth request sent by the fourth terminal, the sixth request comprising the target Single Network Slice Selection Assistance Information, the target Data Network Name, the second identity information, the second type indication information of the second time-sensitive network end station, a sixth Protocol Data Unit session identity, and a sixth Protocol Data Unit session request information element; and a first target label information search unit, which may be configured to obtain the first target label information from the Unified Data Manager according to the target Single Network Slice Selection Assistance Information, the target Data Network Name, the second identity information, and the first type indication information of the second time-sensitive network grandmaster clock in the sixth request.

In an example embodiment, the apparatus 1900 for implementing time synchronization may further include: a fourth terminal Unified Data Manager storage transfer unit, which may be configured to store the target Single Network Slice Selection Assistance Information, the target Data Network Name, the first target label information of the first target Session Management Function, the second identity information, and the second type indication information of the second time-sensitive network end station in the context of the fourth terminal in the Unified Data Manager by using the first target Session Management Function.

In an example embodiment, the apparatus 1900 for implementing time synchronization may further include: a first modification request receiving unit, which may be configured to receive a first modification request sent by the fourth terminal, the first modification request comprising the fifth Protocol Data Unit session identity, the first identity information, the second type indication information of the first time-sensitive network end station, the second identity information, the second type indication information of the second time-sensitive network end station, and the fifth Protocol Data Unit session request information element; and a fourth terminal Unified Data Manager storage modification unit, which may be configured to transmit the fifth Protocol Data Unit session identity, the first identity information, the second type indication information of the first time-sensitive network end station, the second identity information, the second type indication information of the second time-sensitive network end station, and the fifth Protocol Data Unit session request information element to the first target Session Management Function, so that the first target Session Management Function stores the first target label information, the fifth Protocol Data Unit session identity, the first identity information, the second type indication information of the first time-sensitive network end station, the second identity information, the second type indication information of the second time-sensitive network end station, the target Single Network Slice Selection Assistance Information, and the target Data Network Name in the context of the fourth terminal in the Unified Data Manager.

In an example embodiment, the apparatus 1900 for implementing time synchronization may further include: a second modification request receiving unit, which may be configured to receive a second modification request sent by the fourth terminal, the second modification request comprising the sixth Protocol Data Unit session identity and the sixth Protocol Data Unit session request information element and not comprising the second identity information and the second type indication information of the second time-sensitive network end station.

In some embodiments of various units in the apparatus for implementing time synchronization provided in the embodiments of the present disclosure, reference may be made to the foregoing content in the method for implementing time synchronization.

Further, the embodiments of the present disclosure further provide a terminal. The terminal is connected to a first time-sensitive network grandmaster clock in a first time-sensitive network time domain. The terminal includes: one or more processors; and a storage apparatus, configured to store one or more programs, the one or more programs, when executed by the one or more processors, causing the one or more processors to perform the following operation: transmitting a first request to an Access and Mobility Management Function or a Service Communication Proxy, the first request comprising target Single Network Slice Selection Assistance Information, a target Data Network Name, first identity information of the first time-sensitive network time domain, first type indication information of the first time-sensitive network grandmaster clock, a first Protocol Data Unit session identity, and a first Protocol Data Unit session request information element.

In an example embodiment, the one or more programs, when executed by one or more processors, cause the one or more processors to further perform the following operation: transmitting a first time synchronization message of the first time-sensitive network grandmaster clock by using a first Protocol Data Unit session corresponding to the first Protocol Data Unit session identity.

In an example embodiment, the terminal is further connected to a second time-sensitive network grandmaster clock in a second time-sensitive network time domain, and the first request further includes second identity information of the second time-sensitive network time domain and first type indication information of the second time-sensitive network grandmaster clock.

In an example embodiment, the one or more programs, when executed by one or more processors, cause the one or more processors to further perform the following operation: transmitting a second time synchronization message of the second time-sensitive network grandmaster clock by using the first Protocol Data Unit session corresponding to the first Protocol Data Unit session identity.

Further, the embodiments of the present disclosure further provide a terminal. The terminal is connected to a first time-sensitive network end station in a first time-sensitive network time domain. The terminal includes: one or more processors; and a storage apparatus, configured to store one or more programs, the one or more programs, when executed by the one or more processors, causing the one or more processors to perform the following operation: transmitting a second request to an Access and Mobility Management Function or a Service Communication Proxy, the second request comprising target Single Network Slice Selection Assistance Information, a target Data Network Name, first identity information of the first time-sensitive network time domain, second type indication information of the first time-sensitive network end station, a second Protocol Data Unit session identity, and a second Protocol Data Unit session request information element.

In an example embodiment, the one or more programs, when executed by one or more processors, cause the one or more processors to further perform the following operations: receiving, by using a first target Session Management Function and using a second Protocol Data Unit session corresponding to the second Protocol Data Unit session identity, a first time synchronization message sent by a first time-sensitive network grandmaster clock in the first time-sensitive network time domain; and transmitting the first time synchronization message to the first time-sensitive network end station to implement time synchronization between the first time-sensitive network end station and the first time-sensitive network grandmaster clock.

In an example embodiment, the second terminal is further connected to a second time-sensitive network end station in the second time-sensitive network time domain, and the second request further includes the second identity information of the second time-sensitive network time domain and second type indication information of the second time-sensitive network end station. The one or more programs, when executed by one or more processors, cause the one or more processors to further perform the following operations: receiving, by using the first target Session Management Function and using the second Protocol Data Unit session corresponding to the second Protocol Data Unit session identity, a second time synchronization message sent by a second time-sensitive network grandmaster clock in the second time-sensitive network time domain; and transmitting the second time synchronization message to the second time-sensitive network end station to implement time synchronization between the second time-sensitive network end station and the second time-sensitive network grandmaster clock.

Further, the embodiments of the present disclosure further provide a terminal. The terminal is separately connected to a first time-sensitive network end station in a first time-sensitive network time domain, a second time-sensitive network end station in a second time-sensitive network time domain, and a third time-sensitive network end station in a third time-sensitive network time domain. The terminal includes: one or more processors; and a storage apparatus, configured to store one or more programs, the one or more programs, when executed by the one or more processors, causing the one or more processors to perform the following operations: transmitting a fourth request to an Access and Mobility Management Function or a Service Communication Proxy, the fourth request comprising target Single Network Slice Selection Assistance Information, a target Data Network Name, first identity information of the first time-sensitive network time domain, second type indication information of the first time-sensitive network end station, second identity information of the second time-sensitive network time domain, second type indication information of the second time-sensitive network end station, third identity information of the third time-sensitive network time domain second type indication information of the third time-sensitive network end station, a fourth Protocol Data Unit session identity, and a fourth Protocol Data Unit session request information element; and receiving a target label information failure indication or a fourth Protocol Data Unit session setup failure message returned in response to the fourth request.

In an example embodiment, the one or more programs, when executed by one or more processors, cause the one or more processors to further perform the following operation: transmitting a fifth request to the Access and Mobility Management Function or the Service Communication Proxy, the fifth request comprising the target Single Network Slice Selection Assistance Information, the target Data Network Name, the first identity information, the second type indication information of the first time-sensitive network end station, a fifth Protocol Data Unit session identity, and a fifth Protocol Data Unit session request information element.

In an example embodiment, the one or more programs, when executed by one or more processors, cause the one or more processors to further perform the following operation: transmitting a sixth request to the Access and Mobility Management Function or the Service Communication Proxy, the sixth request comprising the target Single Network Slice Selection Assistance Information, the target Data Network Name, the second identity information, the second type indication information of the second time-sensitive network end station, a sixth Protocol Data Unit session identity, and a sixth Protocol Data Unit session request information element.

In an example embodiment, the one or more programs, when executed by one or more processors, cause the one or more processors to further perform the following operation: transmitting a first modification request to the Access and Mobility Management Function or the Service Communication Proxy, the first modification request comprising the fifth Protocol Data Unit session identity, the first identity information, the second type indication information of the first time-sensitive network end station, the second identity information, the second type indication information of the second time-sensitive network end station, and the fifth Protocol Data Unit session request information element.

In an example embodiment, the one or more programs, when executed by one or more processors, cause the one or more processors to further perform the following operation: transmitting a second modification request to the Access and Mobility Management Function or the Service Communication Proxy, the second modification request comprising the sixth Protocol Data Unit session identity and the sixth Protocol Data Unit session request information element and not comprising the second identity information and the second type indication information of the second time-sensitive network end station.

Although a plurality of units of a device configured to perform actions are discussed in the foregoing detailed description, such division is not mandatory. In fact, according to the implementations of the present disclosure, the features and functions of two or more units described above may be embodied in one unit. On the contrary, the features and functions of one unit described above may be further divided into a plurality of units to be specified.

According to the foregoing descriptions of the implementations, a person skilled in the art may readily understand that the example implementations described herein may be implemented by using software, or may be implemented by combining software and necessary hardware. Therefore, the technical solutions according to the implementations of the present disclosure may be implemented in the form of a software product. The software product may be stored in a non-volatile storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the implementations of the present disclosure.

After considering the specification and practicing the present disclosure, a person skilled in the art can easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method for implementing time synchronization, performed by an electronic device, the method comprising:
receiving a first request transmitted by a first terminal, the first terminal being connected to a first time-sensitive network grandmaster clock in a first time-sensitive network time domain, the first request comprising target Single Network Slice Selection Assistance Information, a target Data Network Name, first identity information of the first time-sensitive network time domain, first type indication information of the first time-sensitive network grandmaster clock, a first Protocol Data Unit session identity, and a first Protocol Data Unit session request information element;
determining a first target Session Management Function of the first terminal based on the target Single Network Slice Selection Assistance Information, the target Data Network Name, the first identity information, and the first type indication information of the first time-sensitive network grandmaster clock by using a Network Repository Function;
transmitting the target Single Network Slice Selection Assistance Information, the target Data Network Name, the first identity information, the first type indication information of the first time-sensitive network grandmaster clock and the first Protocol Data Unit session request information element to the first target Session Management Function, wherein the first target Session Management Function stores first target label information of the first target Session Management Function, the target Single Network Slice Selection Assistance Information, the target Data Network Name, the first identity information, and the first type indication information of the first time-sensitive network grandmaster clock for the first terminal in a Unified Data Manager;

receiving a second request transmitted by a second terminal, the second terminal being connected to a first time-sensitive network end station in the first time-sensitive network time domain for synchronization, the second request comprising the target Single Network Slice Selection Assistance Information, the target Data Network Name, the first identity information, second type indication information of the first time-sensitive network end station, a second Protocol Data Unit session identity, and a second Protocol Data Unit session request information element; and obtaining the first target label information from the Unified Data Manager based on the target Single Network Slice Selection Assistance Information, the target Data Network Name, the first identity information, and the first type indication information of the first time-sensitive network grandmaster clock in the second request.

2. The method for implementing time synchronization according to claim 1, wherein the method further comprises:
storing the target Single Network Slice Selection Assistance Information, the target Data Network Name, the first target label information of the first target Session Management Function, the first identity information, and the second type indication information of the first time-sensitive network end station for the second terminal in the Unified Data Manager by using the first target Session Management Function.

3. The method for implementing time synchronization according to claim 1, wherein the determining the first target Session Management Function of the first terminal further comprises:
determining, based on the first type indication information of the first time-sensitive network grandmaster clock, to use the Network Repository Function to select the first target Session Management Function of the first terminal;
providing the target Single Network Slice Selection Assistance Information, the target Data Network Name, and the first identity information to the Network Repository Function; and
receiving the first target label information of the first target Session Management Function determined by the Network Repository Function based on the target Single Network Slice Selection Assistance Information, the target Data Network Name, and the first identity information.

4. The method for implementing time synchronization according to claim 3, wherein the transmitting further comprises:
transmitting the target Single Network Slice Selection Assistance Information, the target Data Network Name, the first identity information, the first type indication information of the first time-sensitive network grandmaster clock, and the first Protocol Data Unit session request information element to the first target Session Management Function; and
transmitting, by the first target Session Management Function, a registration request to the Unified Data Manager, the registration request comprising the target Single Network Slice Selection Assistance Information, the target Data Network Name, the first target label information, the first identity information, and the first type indication information of the first time-sensitive network grandmaster clock.

5. The method for implementing time synchronization according to claim 1, wherein the obtaining the first target label information from the Unified Data Manager further comprises:
determining, based on the second type indication information of the first time-sensitive network end station, to use the Unified Data Manager to query a first target Session Management Function of the second terminal;
transmitting a parameter configuration obtaining request to the Unified Data Manager, the parameter configuration obtaining request comprising the target Single Network Slice Selection Assistance Information, the target Data Network Name, the first identity information, and the first type indication information of the first time-sensitive network grandmaster clock; and
receiving a parameter configuration obtaining response returned by the Unified Data Manager based on the target Single Network Slice Selection Assistance Information, the target Data Network Name, the first identity information, and the first type indication information of the first time-sensitive network grandmaster clock, the parameter configuration obtaining response comprising the first target label information.

6. The method for implementing time synchronization according to claim 5, wherein the method further comprises:
transmitting the target Single Network Slice Selection Assistance Information, the target Data Network Name, the first identity information, and the second Protocol Data Unit session request information element to the first target Session Management Function;
obtaining, by the first target Session Management Function, a first User Plane Function of the first terminal based on the target Single Network Slice Selection Assistance Information, the target Data Network Name, and the first identity information; and
using by the second terminal, when the first User Plane Function is connected to a base station corresponding to the second terminal, the first User Plane Function.

7. The method for implementing time synchronization according to claim 6, wherein the method further comprises:
determining, when the first User Plane Function is not connected to the base station corresponding to the second terminal, a second User Plane Function for the second terminal, the second User Plane Function being connected to the base station corresponding to the second terminal.

8. The method for implementing time synchronization according to claim 1, wherein the method further comprises:
transmitting a first time synchronization message of the first time-sensitive network grandmaster clock by using a first Protocol Data Unit session corresponding to the first Protocol Data Unit session identity;
transmitting the first time synchronization message to the second terminal by using the first target Session Management Function and using a second Protocol Data Unit session corresponding to the second Protocol Data Unit session identity; and
transmitting the first time synchronization message to the first time-sensitive network end station by using the second terminal to implement time synchronization between the first time-sensitive network end station and the first time-sensitive network grandmaster clock.

9. The method for implementing time synchronization according to claim 1, wherein the first terminal is further connected to a second time-sensitive network grandmaster clock in a second time-sensitive network time domain, the first request further comprises second identity information of the second time-sensitive network time domain and first type indication information of the second time-sensitive network grandmaster clock; and the transmitting the target Single Network Slice Selection Assistance Information, the target Data Network Name, the first identity information, the first type indication information of the first time-sensitive network grandmaster clock and the first Protocol Data Unit session request information element to the first target Session Management Function, wherein the first target Session Management Function stores the first target label information of the first target Session Management Function, the target Single Network Slice Selection Assistance Information, the target Data Network Name, the first identity information, and the first type indication information of the first time-sensitive network grandmaster clock for the first terminal in a Unified Data Manager comprises:
  transmitting the target Single Network Slice Selection Assistance Information, the target Data Network Name, the first identity information, the first type indication information of the first time-sensitive network grandmaster clock, the second identity information, the first type indication information of the second time-sensitive network grandmaster clock, and the first Protocol Data Unit session request information element to the first target Session Management Function; and
  storing the target Single Network Slice Selection Assistance Information, the target Data Network Name, the first target label information of the first target Session Management Function, the first identity information, the first type indication information of the first time-sensitive network grandmaster clock, the second identity information, and the first type indication information of the second time-sensitive network grandmaster clock in a context of the first terminal in the Unified Data Manager by using the first target Session Management Function, wherein the first time-sensitive network time domain and the second time-sensitive network time domain share the first target Session Management Function.

10. The method for implementing time synchronization according to claim 9, wherein the method further comprises:
  transmitting a second time synchronization message of the second time-sensitive network grandmaster clock by using a first Protocol Data Unit session corresponding to the first Protocol Data Unit session identity.

11. The method for implementing time synchronization according to claim 10, wherein the second terminal is further connected to a second time-sensitive network end station in the second time-sensitive network time domain, and the second request further comprises the second identity information of the second time-sensitive network time domain and second type indication information of the second time-sensitive network end station; and the method further comprises:
  storing the target Single Network Slice Selection Assistance Information, the target Data Network Name, the first target label information of the first target Session Management Function, the first identity information, the second type indication information of the first time-sensitive network end station, the second identity information, and the second type indication information of the second time-sensitive network end station for the second terminal in the Unified Data Manager by using the first target Session Management Function.

12. The method for implementing time synchronization according to claim 11, wherein the method further comprises:
  transmitting the second time synchronization message to the second terminal by using the first target Session Management Function and using a second Protocol Data Unit session corresponding to the second Protocol Data Unit session identity; and
  transmitting the second time synchronization message to the second time-sensitive network end station by using the second terminal to implement time synchronization between the second time-sensitive network end station and the second time-sensitive network grandmaster clock.

13. The method for implementing time synchronization according to claim 10, wherein the method further comprises:
  receiving a third request sent by a third terminal, the third terminal being connected to a third time-sensitive network grandmaster clock in a third time-sensitive network time domain, the third request comprising the target Single Network Slice Selection Assistance Information, the target Data Network Name, third identity information of the third time-sensitive network time domain, first type indication information of the third time-sensitive network grandmaster clock, a third Protocol Data Unit session identity, and a third Protocol Data Unit session request information element;
  determining a second target Session Management Function of the third terminal based on the target Single Network Slice Selection Assistance Information, the target Data Network Name, the third identity information, and the first type indication information of the third time-sensitive network grandmaster clock in the third request by using the Network Repository Function;
  transmitting the target Single Network Slice Selection Assistance Information, the target Data Network Name, the third identity information, the first type indication information of the third time-sensitive network grandmaster clock, and the third Protocol Data Unit session request information element to the second target Session Management Function, wherein the second target Session Management Function stores second target label information of the second target Session Management Function, the target Single Network Slice Selection Assistance Information, the target Data Network Name, the third identity information, and the first type indication information of the third time-sensitive network grandmaster clock for the third terminal in the Unified Data Manager.

14. The method for implementing time synchronization according to claim 13, wherein the method further comprises:
  receiving a fourth request sent by a fourth terminal, the fourth terminal being separately connected to the first time-sensitive network end station in the first time-sensitive network time domain, a second time-sensitive network end station in the second time-sensitive network time domain, and a third time-sensitive network end station in the third time-sensitive network time domain, the fourth request comprising the target Single Network Slice Selection Assistance Information, the target Data Network Name, the first identity information, the second type indication information of the first time-sensitive network end station, the second identity information, second type indication information of the second time-sensitive network end station, the third identity information, second type indication information of the third time-sensitive network end station, a fourth Protocol Data Unit session identity, and a fourth Protocol Data Unit session request information element;

obtaining a target label information failure indication or separately obtaining the first target label information and the second target label information from the Unified Data Manager based on the target Single Network Slice Selection Assistance Information, the target Data Network Name, the first identity information, the first type indication information of the first time-sensitive network grandmaster clock, the second identity information, the first type indication information of the second time-sensitive network grandmaster clock, the third identity information, and the first type indication information of the third time-sensitive network grandmaster clock in the fourth request; and transmitting a fourth Protocol Data Unit session setup failure message to the fourth terminal based on the target label information failure indication or based on the first target label information and the second target label information.

15. The method for implementing time synchronization according to claim 14, wherein the method further comprises:

receiving a fifth request sent by the fourth terminal, the fifth request comprising the target Single Network Slice Selection Assistance Information, the target Data Network Name, the first identity information, the second type indication information of the first time-sensitive network end station, a fifth Protocol Data Unit session identity, and a fifth Protocol Data Unit session request information element; and obtaining the first target label information from the Unified Data Manager based on the target Single Network Slice Selection Assistance Information, the target Data Network Name, the first identity information, and the first type indication information of the first time-sensitive network grandmaster clock in the fifth request.

16. An apparatus for implementing time synchronization, comprising:

a first request receiving unit configured to receive a first request transmitted by a first terminal, the first terminal being connected to a first time-sensitive network grandmaster clock in a first time-sensitive network time domain, the first request comprising target Single Network Slice Selection Assistance Information, a target Data Network Name, first identity information of the first time-sensitive network time domain, first type indication information of the first time-sensitive network grandmaster clock, a first Protocol Data Unit session identity, and a first Protocol Data Unit session request information element;

a first Session Management Function determining unit configured to determine a first target Session Management Function of the first terminal based on the target Single Network Slice Selection Assistance Information, the target Data Network Name, the first identity information, the first type indication information of the first time-sensitive network grandmaster clock in the first request by using a Network Repository Function;

a first data storage unit configured to transmit the target Single Network Slice Selection Assistance Information, the target Data Network Name, the first identity information, the first type indication information of the first time-sensitive network grandmaster clock and the first Protocol Data Unit session request information element to the first target Session Management Function, wherein the first target Session Management Function stores first target label information of the first target Session Management Function, the target Single Network Slice Selection Assistance Information, the target Data Network Name, the first identity information, and the first type indication information of the first time-sensitive network grandmaster clock for the first terminal in a Unified Data Manager;

a second request receiving unit configured to receive a second request transmitted by a second terminal, the second terminal being connected to a first time-sensitive network end station in the first time-sensitive network time domain for synchronization, the second request comprising the target Single Network Slice Selection Assistance Information, the target Data Network Name, the first identity information, second type indication information of the first time-sensitive network end station, a second Protocol Data Unit session identity, and a second Protocol Data Unit session request information element; and a first target label information obtaining unit configured to obtain the first target label information from the Unified Data Manager based on the target Single Network Slice Selection Assistance Information, the target Data Network Name, the first identity information, and the first type indication information of the first time-sensitive network grandmaster clock in the second request.

17. A terminal connected to a first time-sensitive network grandmaster clock in a first time-sensitive network time domain, the terminal comprising:

one or more processors; and a storage apparatus, configured to store one or more programs, the one or more programs, when executed by the one or more processors, causing the one or more processors to perform the following operation:

transmitting a first request to an Access and Mobility Management Function or a Service Communication Proxy, the first request comprising target Single Network Slice Selection Assistance Information, a target Data Network Name, first identity information of the first time-sensitive network time domain, first type indication information of the first time-sensitive network grandmaster clock, a first Protocol Data Unit session identity, and a first Protocol Data Unit session request information element, wherein the first request is used for synchronization of a second terminal.

18. The terminal according to claim 17, wherein the one or more programs, when executed by the one or more processors, causing the one or more processors to further perform the following operation:

transmitting a first time synchronization message of the first time-sensitive network grandmaster clock by using a first Protocol Data Unit session corresponding to the first Protocol Data Unit session identity.

19. The terminal according to claim 18, wherein the terminal is further connected to a second time-sensitive network grandmaster clock in a second time-sensitive network time domain, and the first request further comprises second identity information of the second time-sensitive network time domain and first type indication information of the second time-sensitive network grandmaster clock.

20. The terminal according to claim 19, wherein the one or more programs, when executed by the one or more processors, causing the one or more processors to further perform the following operation:

transmitting a second time synchronization message of the second time-sensitive network grandmaster clock by using the first Protocol Data Unit session corresponding to the first Protocol Data Unit session identity.

* * * * *